US010468960B2

(12) United States Patent
Nishimoto et al.

(10) Patent No.: US 10,468,960 B2
(45) Date of Patent: Nov. 5, 2019

(54) CODE MODULATOR FOR CODE-MODULATING POWER WITH MODULATION CODE, CODE DEMODULATOR FOR CODE-DEMODULATING CODE-MODULATED POWER WITH DEMODULATION CODE, AND CONTROLLER THEREOF

(71) Applicant: Panasonic Intellectual Property Management Co., Ltd., Osaka (JP)

(72) Inventors: Taiki Nishimoto, Osaka (JP); Atsushi Yamamoto, Kyoto (JP); Shoichi Hara, Tokyo (JP); Kohei Masuda, Osaka (JP); Akira Minegishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 270 days.

(21) Appl. No.: 15/485,712

(22) Filed: Apr. 12, 2017

(65) Prior Publication Data

US 2017/0222539 A1 Aug. 3, 2017

Related U.S. Application Data

(63) Continuation of application No. PCT/JP2016/003514, filed on Jul. 29, 2016.

(30) Foreign Application Priority Data

Sep. 29, 2015 (JP) ................................. 2015-191920
Oct. 23, 2015 (JP) ................................. 2015-208607

(51) Int. Cl.
*H02M 1/08* (2006.01)
*G05B 15/02* (2006.01)
(Continued)

(52) U.S. Cl.
CPC .............. *H02M 1/08* (2013.01); *G05B 15/02* (2013.01); *H02J 13/0082* (2013.01); *H04B 1/69* (2013.01); *H02M 2001/0048* (2013.01)

(58) Field of Classification Search
CPC .. H02M 1/08; H02M 2001/0048; G05B 15/02
See application file for complete search history.

(56) References Cited

U.S. PATENT DOCUMENTS 4,979,087 A * 12/1990 Sellwood ................ H01F 38/14
363/34
6,072,829 A * 6/2000 Dirr .......................... H04L 5/14
341/109
(Continued)

FOREIGN PATENT DOCUMENTS

JP 11-146564 5/1999
JP 11-182256 7/1999
(Continued)

OTHER PUBLICATIONS

International Search Report of PCT application No. PCT/JP2016/003514 dated Oct. 11, 2016.
(Continued)

*Primary Examiner* — Vincent H Tran
(74) *Attorney, Agent, or Firm* — McDermott Will & Emery LLP

(57) ABSTRACT

A code modulator includes: a code-modulation circuit that code-modulates input power with a modulation code to generate code-modulated power which is alternating-current power; and a terminal through which the code-modulated power is transmitted, the terminal being connected to a transmission path.

22 Claims, 18 Drawing Sheets

(51) Int. Cl.

| | |
|---|---|
| ***H02J 13/00*** | (2006.01) |
| ***H04B 1/69*** | (2011.01) |
| *H02M 1/00* | (2006.01) |

(56) References Cited

U.S. PATENT DOCUMENTS 9,250,299 B1 * 2/2016 Yarlagadda ............ G01D 21/02
2002/0111905 A1 8/2002 Nagafuchi et al.
2002/0125941 A1 * 9/2002 Nguyen ............ H02M 3/33576 330/10
2004/0090372 A1 * 5/2004 Nallo ..................... H01Q 1/243 343/700 MS
2004/0110519 A1 6/2004 Chang et al.
2004/0184487 A1 * 9/2004 Kim ................. H04B 10/25754 370/516
2011/0234008 A1 * 9/2011 Stiesdal .................. H02M 1/12 307/82
2012/0185708 A1 7/2012 Rekimoto et al.
2013/0033235 A1 * 2/2013 Fukaya ................... H02J 17/00 320/162
2013/0226484 A1 8/2013 Rouvala et al.
2014/0185328 A1 * 7/2014 Rosado ................... H02M 1/40 363/17
2015/0115762 A1 * 4/2015 Rozman ............... G01D 5/2066 310/180
2015/0365033 A1 * 12/2015 Salmon ................... H02P 27/02 322/47
2015/0380976 A1 * 12/2015 Heo ........................ H02J 7/027 455/573
2016/0006591 A1 * 1/2016 Huomo .................. H04B 3/542 375/295
2016/0149509 A1 * 5/2016 Hergt ...................... H02M 7/04 307/82
2017/0032878 A1 * 2/2017 Sweeney .............. H03K 17/954
2017/0117913 A1 * 4/2017 Yamamoto .......... H03M 1/0617
2017/0163281 A1 * 6/2017 Hara ..................... H03M 5/145
2017/0229974 A1 * 8/2017 Yamaoka ................. H03K 9/02
2017/0317718 A1 * 11/2017 Yamamoto ............. H04B 3/542

FOREIGN PATENT DOCUMENTS

| | | |
|---|---|---|
| JP | 2002-236725 A | 8/2002 |
| JP | 2003-009543 | 1/2003 |
| JP | 2003-348118 | 12/2003 |
| JP | 2004-320344 A | 11/2004 |
| JP | 2009-077606 | 4/2009 |
| JP | 2011-091954 | 5/2011 |
| JP | 2013-138612 | 7/2013 |

OTHER PUBLICATIONS

The Extended European Search Report dated Oct. 4, 2018 for the related European Patent Application No. 16849917.6.

* cited by examiner

CODE MODULATOR FOR CODE-MODULATING POWER WITH MODULATION CODE, CODE DEMODULATOR FOR CODE-DEMODULATING CODE-MODULATED POWER WITH DEMODULATION CODE, AND CONTROLLER THEREOF

BACKGROUND

1. Technical Field

The present disclosure relates to a code modulator, a code demodulator, a controller, and a power transmission system including the code modulator, the code demodulator, and the controller.

2. Description of the Related Art

In recent years, installing a local, small-scale power grid has been proposed in order to reduce losses due to long-distance power transmission. A power source (e.g., a renewable-energy power source) connected to such a power grid has a lower power-generating capability than a core power source for a large-scale commercial power grid and tends to have large variations in the power-generating capability. Thus, in order to stably and efficiently utilize energy in the small-scale power grid, there are demands for a power transmission system that can transmit and receive power with high transmission efficiency.

Japanese Patent No. 5612718 discloses a multi-terminal power conversion apparatus for asynchronously and flexibly supplying power.

Japanese Unexamined Patent Application Publication No. 2011-91954 discloses a power supply apparatus including a communication unit that transmits/receives information signals to/from another apparatus and a power-supply unit that supplies power to the other apparatus.

SUMMARY

In one general aspect, the techniques disclosed here feature a code modulator including: a code-modulation circuit that code-modulates input power with a modulation code to generate code-modulated power which is alternating-current power; and a terminal through which the code-modulated power is transmitted, the terminal being connected to a transmission path.

It should be noted that comprehensive or specific embodiments may be implemented as a controller, a power transmission system, and a power transmission method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
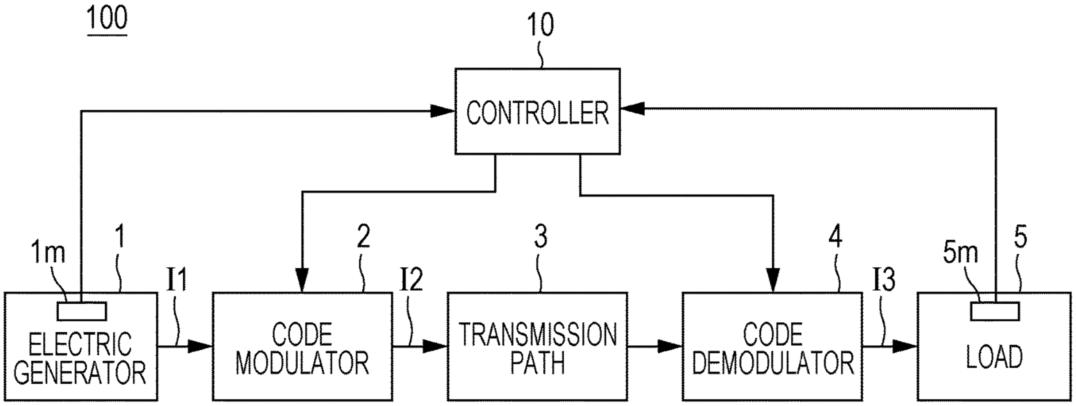
FIG. 1 is a block diagram illustrating an example configuration of a power transmission system according to a first embodiment.

Embodiments according to the present disclosure will be described below with reference to the accompanying drawings. In each embodiment described below, the same or similar constituent elements are denoted by the same reference numerals and/or the same name.

The embodiments described below all represent comprehensive or specific examples. Numerical values, codes, waveforms, the types of element, the arrangement and connection of elements, signal flows, circuit blocks, and so on described below are examples and are not intended to limit the present disclosure. In addition, constituent element not set forth in the independent claims that represent the broadest concept are optional constituent elements.

First Embodiment

[1. Power Transmission System]

FIG. 1 illustrates the configuration of a power transmission system 100 according to a first embodiment. The power transmission system 100 includes an electric generator 1, a code modulator 2, a transmission path 3, a code demodulator 4, a load 5, and a controller 10.

The electric generator 1 generates power (e.g., direct-current power). The code modulator 2 code-modulates the generated power with a modulation code to thereby generate code-modulated power (i.e., a code-modulated wave). The code-modulated power is transmitted from the code modulator 2 to the code demodulator 4 through the transmission path 3. The transmission path 3 is, for example, a wired transmission path. The code demodulator 4 code-demodulates the code-modulated power with a demodulation code to thereby obtain power (e.g., direct-current power). The obtained power is supplied to, for example, the load 5.

The modulation code and the demodulation code are signals including respective predetermined code sequences.

The code-modulated power is alternating-current power. In the present disclosure, the "alternating-current power" refers to power whose flow direction reverses periodically or aperiodically and whose current average value and/or voltage average value become(s) generally 0 in a sufficiently long period of time. The current (or voltage) average value being generally 0 means that the absolute value of the current (or voltage) average value after the code modulation is smaller than a predetermined value. This predetermined value is a value obtained by, for example, dividing the maximum value of a current (or a voltage) before the code modulation by the code length of the modulation code. The alternating-current power has, for example, a waveform whose polarity changes at every predetermined period (e.g., a period corresponding to an integer multiple of a unit period).

The electric generator 1 has, for example, a power measuring instrument 1*m*. The power measuring instrument 1*m* measures the amount of electricity generated by the electric generator 1 and transmits the measured amount of electricity generated to the controller 10. The amount of electricity generated corresponds to, for example, the amount of power transmitted from the electric generator 1 to the code modulator 2. The power measuring instrument 1*m* may be provided at a stage prior to the code modulator 2.

The load 5 has, for example, a power measuring instrument 5*m*. The power measuring instrument 5*m* measures the amount of power used by the load 5 and transmits the measured amount of power used to the controller 10. The amount of power used corresponds to, for example, the amount of power transmitted from the code demodulator 4 to the load 5. The power measuring instrument 5*m* may be provided at a stage subsequent to the code demodulator 4.

Each of the electric generator 1 and the load 5 may be, for example, a power storage device, such as a battery or a capacitor. In this case, for example, power generated in a time slot in which the amount of power consumption is small can be stored, and the stored power can be effectively used. This makes it possible to improve the power efficiency of the entire system.

The controller 10 receives information about the measured amounts of power and controls of the code modulator 2 and the code demodulator 4 on the basis of the corresponding amounts of power. For example, the controller 10 transmits instruction signals to the code modulator 2 and the code demodulator 4.

The instruction signals include a synchronization signal for making the operation of the code modulator 2 and the operation of the code demodulator 4 synchronize with each other. The instruction signals transmitted to the code modulator 2 include, for example, timing information indicating a timing at which the generated power is to be code-modulated. The instruction signals transmitted to the code demodulator 4 include, for example, timing information indicating a timing at which the code-modulated power is to be code-demodulated. This makes it possible to cause the code modulation and the code demodulation of power to synchronize with each other accurately.

The instruction signals transmitted to the code modulator 2 include, for example, code information regarding the modulation code, and the instruction signals transmitted to the code demodulator 4 include, for example, code information regarding the demodulation code. In the present disclosure, the "code information" may be a code sequence itself, may be designation information for designating a specific one of a plurality of code sequences, or may be parameter information for generating a code sequence.

For example, the controller 10 may transmit a code sequence of a modulation code to the code modulator 2 and may transmit a code sequence of a demodulation code to the code demodulator 4.

For example, the controller 10 may transmit designation information that designates a code sequence of a modulation code to the code modulator 2, and the code modulator 2 may generate a modulation code on the basis of the designation information. The controller 10 may transmit designation information that designates a code sequence of a demodulation code to the code demodulator 4, and the code demodulator 4 may generate a demodulation code on the basis of the designation information.

Alternatively, the modulation code may be pre-set in the code modulator 2, and the demodulation code may be pre-set in the code demodulator 4.

Now, suppose a case in which the power transmission system 100 includes a plurality of electric generators 1, a plurality of code modulators 2, a plurality of code demodulators 4, and a plurality of loads 5, by way of example. In this case, for example, the controller 10 transmits the code information regarding the modulation code to one code modulator 2 selected from the plurality of code modulators 2 and transmits the code information regarding the demodulation code to one code demodulator 4 selected from the plurality of code demodulators 4. This allows power to be transmitted from the electric generator 1 connected to the selected code modulator 2 to the load 5 connected to the selected code demodulator 4.

FIG. 1 illustrates a generated current I1, a code-modulated current I2, and a code-demodulated current I3, instead of the generated power, the code-modulated power, and the code-demodulated power. Although an example in which a current is modulated and demodulated is described below, the present disclosure is not limited thereto, and for example, a voltage may be modulated and demodulated. The "current" in the description below can be read instead as a "voltage" or "power", as appropriate.

[2. Transmission Efficiency of Code-Modulated Power]

Figure 2:
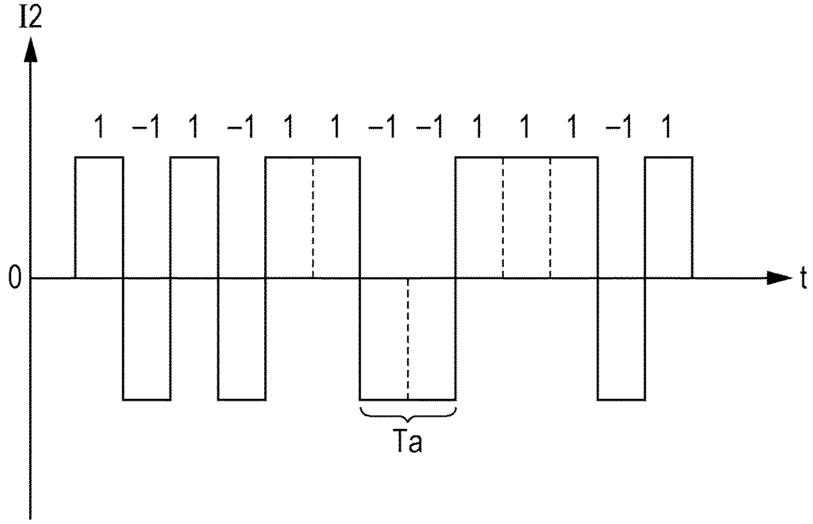
FIG. 2 is a diagram illustrating one example of the waveform of a modulated current according to the first embodiment.
Figure 3:
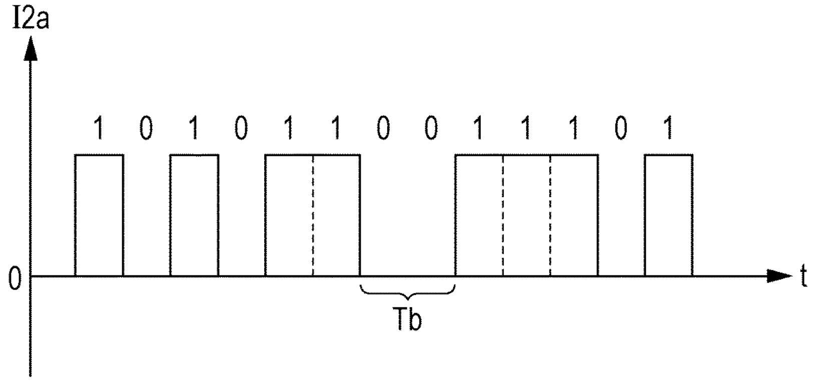
FIG. 3 is a diagram illustrating a comparative example of the waveform of the modulated current.

FIG. 2 illustrates an example of the waveform of the modulated current I2. FIG. 3 illustrates an example of the waveform of a modulated current I2*a* according to a comparative example. In FIG. 2, "1s" and "−1 s" represent values constituting a modulation code, the values corresponding to the current values of the modulated current I2 in corresponding periods. In FIG. 3, "1s" and "0s" represent values constituting a demodulation code, the values corresponding to the current values of the modulated current I2*a* in corresponding periods. A code sequence consisting of "0s" and "1s" corresponds to a modulation code used in a typical communication system.

In the example illustrated in FIG. 2, the code modulator 2 converts the generated current I1 into a modulated wave (i.e., the modulated current I2) having "1s" and "−1s". Thus, the modulated current I2 is alternating current. In this case, in each period in which the modulated current I2 indicates "1", positive current is transmitted from the code modulator 2 to the code demodulator 4, and in each period in which the modulated current I2 indicates "−1" (e.g., a period Ta in FIG. 2), negative current is transmitted from the code modulator 2 to the code demodulator 4. Thus, power is transmitted in all periods, thereby realizing high transmission efficiency.

In the example illustrated in FIG. 3, the modulated current I2*a* has a modulated wave having "1s" and "0s" and is not alternating current. In this case, in a period in which the modulated current I2*a* indicates "0" (e.g., a period Tb in FIG. 3), the modulated current I2*a* becomes zero, and thus no power is transmitted. Thus, when the code-modulated power is not alternating-current power, the power transmission efficiency decreases.

Comparison between FIG. 2 and FIG. 3 shows that power can be transmitted with high transmission efficiency when the code-modulated power is alternating-current power, particularly, when the code sequence of the modulation code does not include "0".

[3. Code Modulation and Demodulation of Direct-Current Power]

Figure 4A:
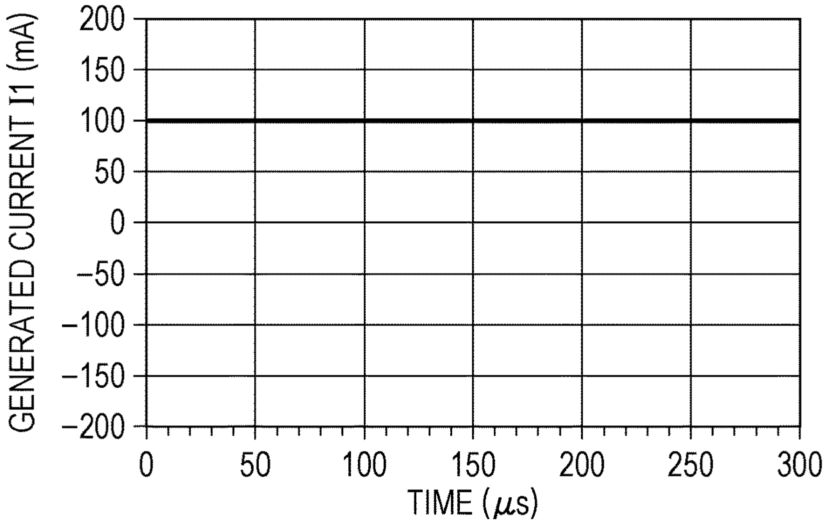
FIG. 4A is a graph illustrating one example of the waveform of a generated current according to the first embodiment.
Figure 4B:
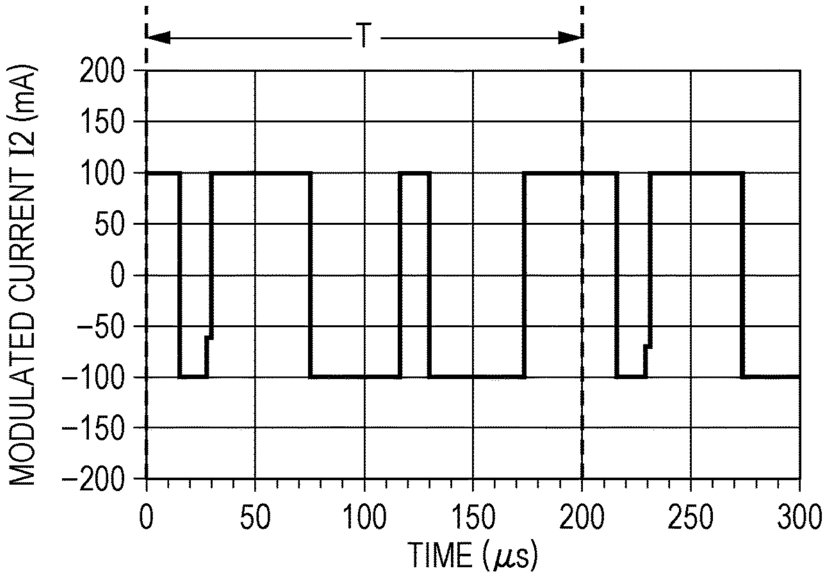
FIG. 4B is a graph illustrating one example of the waveform of a modulated current according to the first embodiment.
Figure 4C:
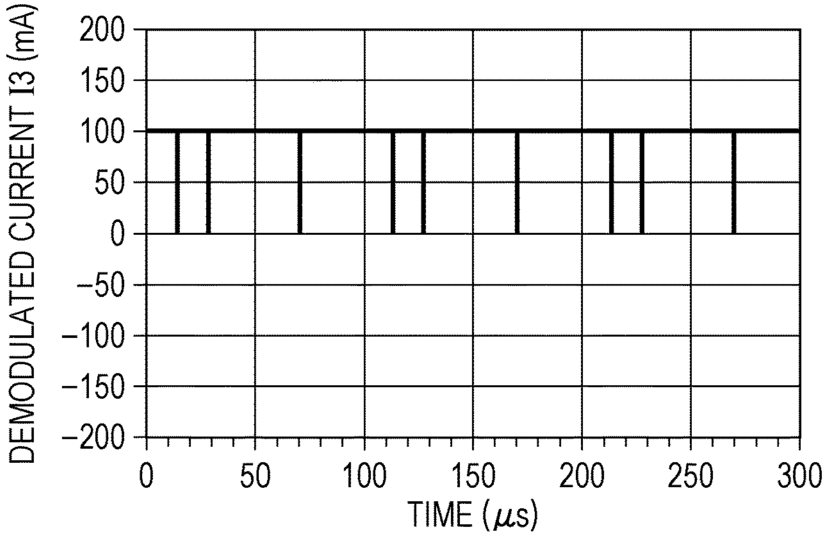
FIG. 4C is a graph illustrating one example of the waveform of a demodulated current according to the first embodiment.

FIGS. 4A to 4C illustrate examples of the waveforms of the generated current I1, the modulated current I2, and the demodulated current I3, respectively.

The generated current I1 illustrated in FIG. 4A was direct current.

The modulated current I2 illustrated in FIG. 4B was obtained by multiplying the generated current I1 by a modulation code M1. In this example, the modulation code M1 had a code sequence noted below:

$$M1=[1\ -1\ 1\ 1\ 1\ -1\ -1\ -1\ 1\ -1\ -1\ -1\ 1\ 1] \quad (1)$$

The frequency of the modulation code was 35 kHz, and the time span of each value constituting the modulation code was 14.3 (={1/(35 kHz)}/2) microseconds (μs). A period T illustrated in FIG. 4B represents one cycle of the code sequence of the modulation code M1.

The demodulated current I3 illustrated in FIG. 4C was obtained by multiplying the modulated current I2 with a demodulation code D1. In this example, the modulation code M1 and the demodulation code D1 had the same code sequence. That is, the demodulation code D1 had a code sequence noted below:

$$D1=[1\ -1\ 1\ 1\ 1\ -1\ -1\ -1\ 1\ -1\ -1\ -1\ 1\ 1] \quad (2)$$

In this case, the frequency of the demodulation code was 35 kHz, and the time span of each values constituting the demodulation code was about 14.3 μs.

A result obtained by multiplying the modulated current I2 by the demodulation code D1 corresponds to a result obtained by multiplying the generated current I1 by M1×D1. In this case, M1×D1 has a code sequence noted below:

$$M1\times D1=[1\ 1\ 1\ 1\ 1\ 1\ 1\ 1\ 1\ 1\ 1\ 1\ 1\ 1] \quad (3)$$

Thus, as illustrated in FIG. 4C, a direct current equivalent to the generated current I1 was restored as the demodulated current I3 through the code modulation and the code demodulation.

As described above, the modulation and demodulation method according to the present embodiment makes it possible to realize power transmission in which synchronization is accurately performed and power loss is small.

For example, when the modulation code M1 is repeatedly used in the manner illustrated in FIG. 4B, power can be transmitted with high efficiency for a long period of time.

In the above-described example, the eighth to 14th values of the modulation code M1 respectively correspond to values obtained by reversing the polarities of the first to seventh values of the modulation code M1. When such modulation code is used, the average of the modulated current I2 becomes 0, thus making it possible to realize transmission with only alternating current that is free of direct-current components. Thus, it is possible to transmit power with high transmission efficiency.

[4. Code Modulator and Code Demodulator]

Figure 5:
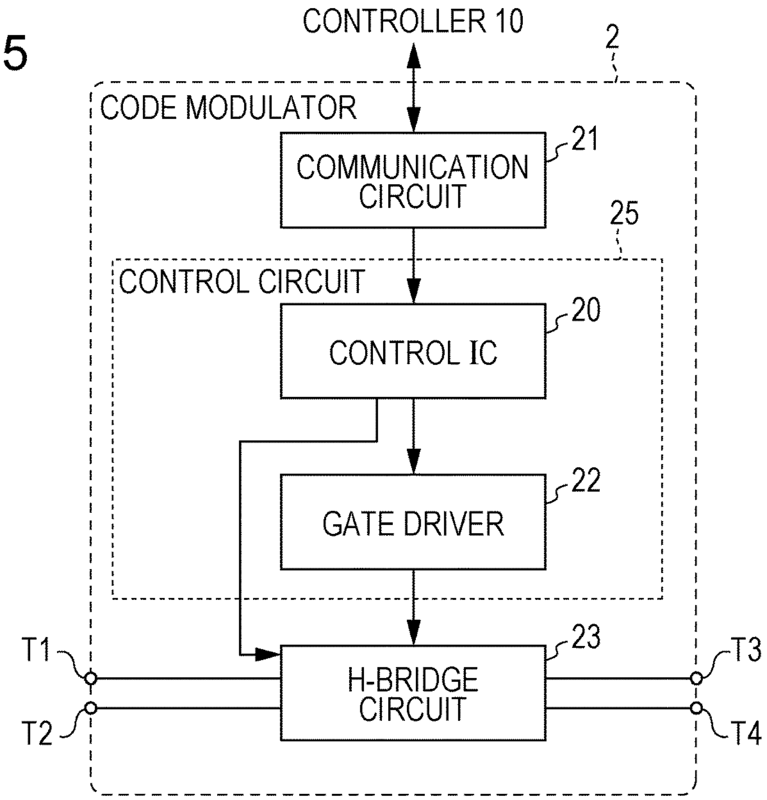
FIG. 5 is a block diagram illustrating one example of the configuration of a code modulator according to the first embodiment.

FIG. 5 illustrates an example configuration of the code modulator 2.

In FIG. 5, the code modulator 2 includes a communication circuit 21, a control circuit 25, and an H-bridge circuit 23. The control circuit 25 includes, for example, a control integrated circuit (IC) 20 and a gate driver 22.

The communication circuit 21 receives the instruction signals from the controller 10 and outputs the instruction signals to the control IC 20. The communication circuit 21 includes, for example, an antenna, a tuner circuit, and a wave detector.

The instruction signals include, for example, a synchronization signal and code information regarding the modulation code. Each synchronization signal may be, for example, a trigger signal for starting the modulation and/or may be a trigger signal for ending the modulation. Alternatively, the synchronization signal may be, for example, time information indicating the time at which the modulation is to be started and/or time information indicating the time at which the modulation is to be ended. The trigger signals and the time information are examples of timing information in the present disclosure.

The control IC 20 generates a modulation code on the basis of the instruction signals and causes the gate driver 22 to generate control signals according to the modulation code. The control IC 20 includes a processor. The control IC 20 is, for example, a microcomputer.

The gate driver 22 outputs the control signals to the H-bridge circuit 23 to thereby cause the H-bridge circuit 23 to execute a code modulation operation.

The code modulator 2 has input terminals T1 and T2 connected to the electric generator 1 and output terminals T3 and T4 connected to the transmission path 3.

Figure 6:
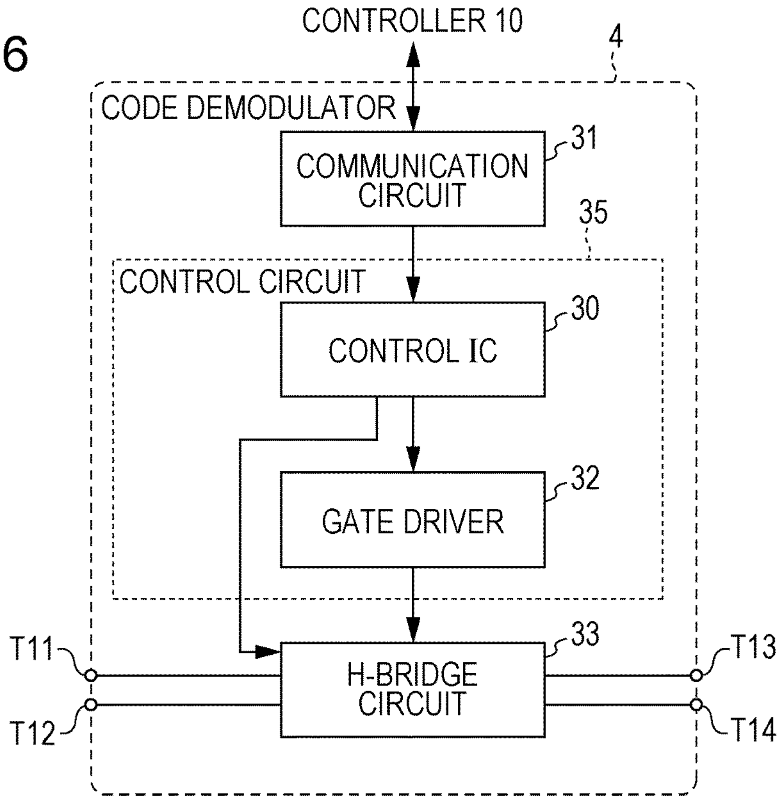
FIG. 6 is a block diagram illustrating one example of the configuration of a code demodulator according to the first embodiment.

FIG. 6 illustrates an example configuration of the code demodulator 4.

In FIG. 6, the code demodulator 4 includes a communication circuit 31, a control circuit 35, and an H-bridge circuit 33. The control circuit 35 includes, for example, a control IC 30 and a gate driver 32.

The communication circuit 31 receives the instruction signals from the controller 10 and outputs the instruction signals to the control IC 30. The communication circuit 31 includes, for example, an antenna, a tuner circuit, and a wave detector.

The instruction signals include, for example, a synchronization signal and code information regarding the demodulation code. The synchronization signal may be, for example, a trigger signal for starting the demodulation and/or a trigger signal for ending the demodulation. Alternatively, the synchronization signal may be, for example, time information indicating the time at which the demodulation is to be started and/or time information indicating the time at which the demodulation is to be ended. The trigger signals and the time information are examples of the timing information in the present disclosure.

The control IC 30 generates a demodulation code on the basis of the instruction signals and causes the gate driver 32 to generate control signals according to the demodulation code. The control IC 30 includes a processor and is, for example, a microcomputer.

The gate driver 32 outputs the control signals to the H-bridge circuit 33 to thereby cause the H-bridge circuit 33 to execute a code demodulation operation.

The code demodulator 4 has input terminals T11 and T12 connected to the transmission path 3 and output terminals T13 and T14 connected to the load 5.

As illustrated in FIG. 1, the controller 10 transmits the control signals to the code demodulator 4 and the code modulator 2 through paths different from the transmission path 3. The controller 10, however, may transmit the control signals to the code modulator 2 and the code demodulator 4 through the transmission path 3. In this case, the control signals can be transmitted, for example, through multiplexing with the code-modulated power. For example, this reduces the number of communication paths from the controller 10 to the code modulator 2 and the code demodulator 4, thereby making it possible to reduce cost.

Figure 7:
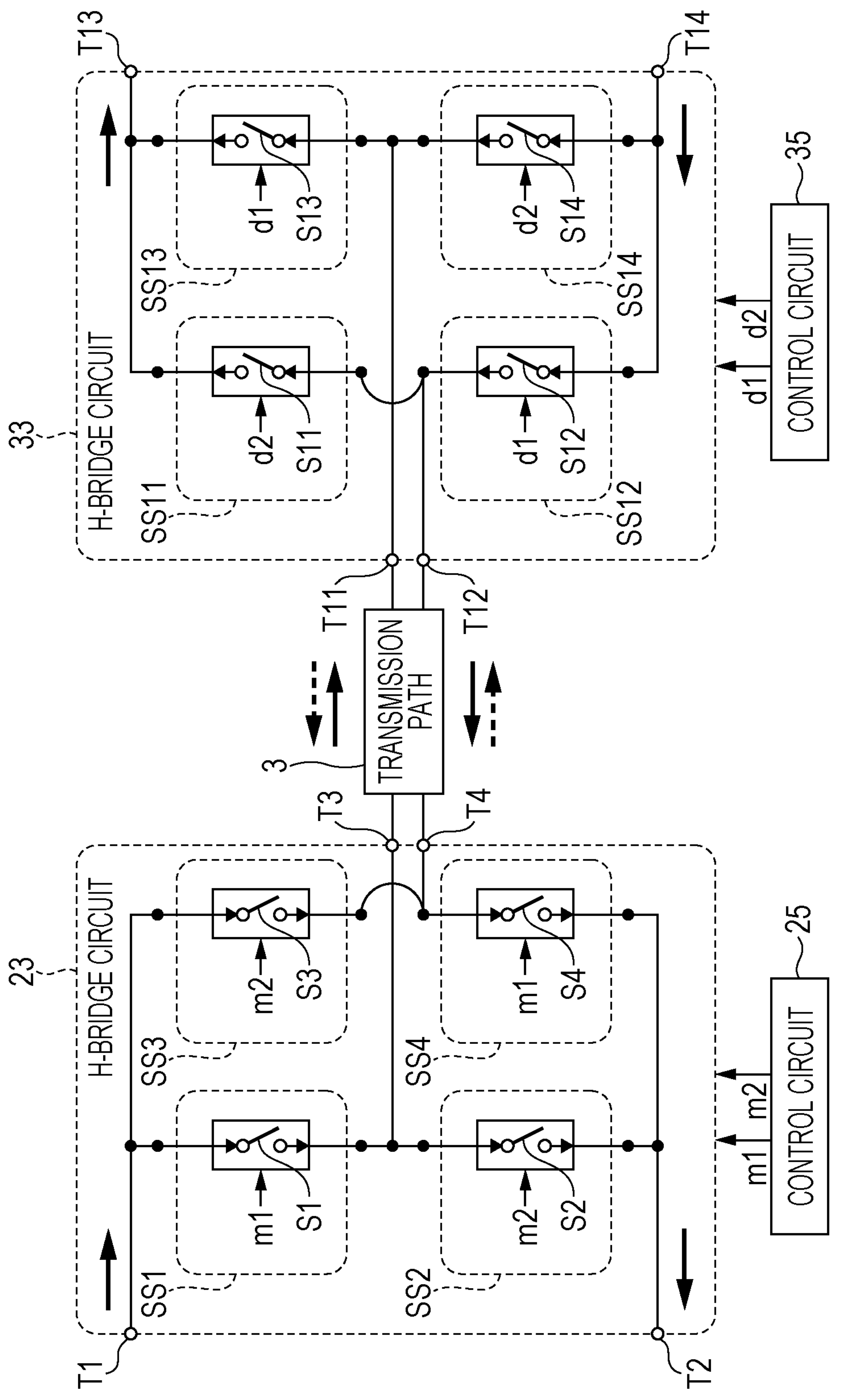
FIG. 7 is a schematic circuit diagram illustrating one example of the configuration of a code modulator, a transmission path, and a code demodulator according to the first embodiment.

FIG. 7 illustrates an example configuration of the control circuit 25 and the H-bridge circuit 23 in the code modulator 2 and an example configuration of the control circuit 35 and the H-bridge circuit 33 in the code demodulator 4.

In FIG. 7, the H-bridge circuit 23 includes four switch circuits SS1, SS2, SS3, and SS4 connected in a full-bridge configuration. For example, the switch circuits SS1, SS2, SS3, and SS4 include switches S1, S2, S3, and S4, respectively.

In FIG. 7, the H-bridge circuit 33 includes four switch circuits SS11, SS12, SS13, and SS14 connected in a full-bridge configuration. For example, the switch circuits SS11, SS12, SS13, and SS14 include switches S11, S12, S13, and S14, respectively.

Each of the switches S1 to S4 and S11 to S14 may be, for example, a bidirectional switch or a metal-oxide semiconductor (MOS) transistor.

The control circuit 25 generates predetermined code sequences m1 and m2. The control circuit 25 outputs the code sequence m1 to the switches S1 and S4 as control signals and outputs the code sequence m2 to the switches S2 and S3 as control signals.

For example, each of the switches S1 to S4 is in an ON state when a signal indicating "1" is input thereto, and each of the switches S1 to S4 is in an OFF state when a signal indicating "0" is input thereto. When the switch S1 is in the ON state, current flows from the terminal T1 to the terminal T3. When the switch S3 is in the ON state, current flows from the terminal T1 to the terminal T4. When the switch S2 is in the ON state, current flows from the terminal T3 to the terminal T2. When the switch S4 is in the ON state, current flows from the terminal T4 to the terminal T2.

The control circuit 35 generates predetermined code sequences d1 and d2. The control circuit 35 outputs the code sequence d1 to the switches S12 and S13 as control signals and outputs the code sequence d2 to the switches S11 and S14 as control signals.

For example, each of the switches S11 to S14 is in an ON state when a signal indicating "1" is input thereto, and each of the switches S11 to S14 is in an OFF state when a signal indicating "0" is input thereto. When the switch S11 is in the ON state, current flows from the terminal T12 to the terminal T13. When the switch S13 is in the ON state, current flows from the terminal T11 to the terminal T13. When the switch S12 is in the ON state, current flows from the terminal T14 to the terminal T12. When the switch S14 in the ON state, current flows from the terminal T14 to the terminal T11.

In FIG. 7, current that flows in the direction indicated by each solid-line arrow is regarded as positive current. In FIG. 7, the structure of the code modulator 2 and the structure of the code demodulator 4 are generally symmetrical to each other, but the directions in which the currents flow differ from each other.

[5. Operation]

[5-1. Control Signals]

Table 1 illustrates examples of code sequences of the control signals m1 and m2 input to the switches S1 to S4 in the code modulator 2 and examples of code sequences of the control signals d1 and d2 input to the switches S11 to S14 in the code demodulator 4.

TABLE 1

| CONTROL SIGNAL | CODE SEQUENCE |
|---|---|
| m1 | c1a = [1 0 1 1 1 0 0] |
| m2 | c1b = [0 1 0 0 0 1 1] |
| d1 | c1a = [1 0 1 1 1 0 0] |
| d2 | c1b = [0 1 0 0 0 1 1] |

In the examples, the code sequence of the control signals m1 and the code sequence of the control signals d1 are the same code sequence c1*a*, and the code sequence of the control signals m2 and the code sequence of the control signals d2 are the same code sequence c1*b*. The code sequence c1*b* is a sequence obtained by inverting all bits of the code sequence c1*a*.

[5-2. Operation of Code Modulator]

A description will be given of the operation of the code modulator 2.

When the control signal m1 indicates "1", and the control signal m2 indicates "0", the switches S1 and S4 are in the ON state, and the switches S2 and S3 in the OFF state. At this point in time, a positive generated current I1 input to the code modulator 2 flows in the direction indicated by the solid-line arrow in FIG. 7, so that a positive modulated current I2 flows to the terminals T3 and T4. That is, the generated current I1 is code-modulated with "1".

On the other hand, when the control signal m1 indicates "0", and the control signal m2 indicates "1", the switches S1 and S4 are in the OFF state, and the switches S2 and S3 are in the ON state. At this point in time, a positive generated current I1 input to the code modulator 2 flows in the direction indicated by the dotted-line arrow in FIG. 7, so that a negative modulated current I2 flows to the terminals T3 and T4. That is, the generated current I1 is code-modulated with "−1".

The series of switching operations based on the control signals m1 and m2 shown in Table 1 corresponds to an operation for code-modulating the generated current I1 with a modulation code Ma given by:

$$Ma=[1\ -1\ 1\ 1\ 1\ -1\ -1] \quad (4)$$

Thus, the code modulator 2 code-modulates the generated current I1 with the modulation code Ma and outputs a modulated alternating current I2 to the transmission path 3 via the terminals T3 and T4.

[5-3. Operation of Code Demodulator]

A description will be given of the operation of the code demodulator 4.

The control signals d1 and d2 are synchronized with the control signals m1 and m2. Thus, when a positive modulated current I2 is input to the code demodulator 4, the control signal d1 indicates "1", and the control signal d2 indicates "0". At this point in time, the switches S13 and S12 are in the ON state, and the switches S11 and S14 are in the OFF state. Thus, the positive modulated current I2 flows in the direction indicated by the solid-line arrow in FIG. 7, so that a positive demodulated current I3 flows to the terminals T13 and T14. That is, the modulated current I2 is code-demodulated with "1".

On the other hand, when a negative modulated current I2 is input to the code demodulator 4, the control signal d1 indicates "0", and the control signal d2 indicates "1". At this point in time, the switches S11 and S14 are in the ON state, and the switches S12 and S13 are in the OFF state. Thus, the negative modulated current I2 flows in the direction indicated by the solid-line arrow in FIG. 7, so that a positive demodulated current I3 flows to the terminals T13 and T14. That is, the modulated current I2 is code-demodulated with "−1".

The series of switching operations based on the control signals d1 and d2 in Table 1 corresponds to an operation for code-demodulating the modulated current I2 with a demodulation code Da given by:

$$Da=[1\ -1\ 1\ 1\ 1\ -1\ -1] \quad (5)$$

Thus, the code demodulator 4 code-demodulates the modulated current I2 with the demodulation code Da and outputs the positive demodulated current I3 via the terminals T13 and T14.

[5-4. Other Examples of Control Signals]

Table 2 illustrates other examples of the code sequences of the control signals m1, m2, d1, and d2.

TABLE 2

| CONTROL SIGNAL | CODE SEQUENCE |
|---|---|
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |

In each of the code sequences of the control signals m1 and m2 shown in Table 1, the number of "1s" and the number of "0s" are not equal to each other. Thus, in the code sequence of the modulation code Ma, the number of "1s" and the number of "−1s" are not equal to each other. In such a case, the average of the modulated current I2 does not become 0, and the modulated current I2 is alternating current including a small amount of direct-current components.

On the other hand, in Table 2, the control signals m1 and d1 each have a code sequence [c1*a* c1*b*] in which the code sequence c1*a* and the code sequence c1*b* are coupled in tandem, and the control signals m2 and d2 each have a code sequence [c1*b* c1*a*] in which the code sequence c1*b* and the code sequence c1*a* are coupled in tandem. Since the code sequence c1*b* is a sequence in which all bits of the code sequence c1*a* are inverted, as described above, the number of "1s" and the number of "0s" in a code sequence in which the code sequences c1*a* and c1*b* are coupled are equal to each other. Thus, the modulated current I2 is an alternating current that does not include direct-current components, thus further enhancing the transmission efficiency. The control signals m1 and m2 shown in Table 2 correspond to the modulation code M1 described above, and the control signals d1 and d2 correspond to the demodulation code D1 described above.

Second Embodiment

A power transmission system according to a second embodiment is substantially the same as the power transmission system 100 described above in the first embodiment, except that generated power is alternating-current power. Of the second embodiment, points that are different from the first embodiment will be described below.

[1. Code Modulation and Demodulation of Alternating-Current Power]

Figure 8A:
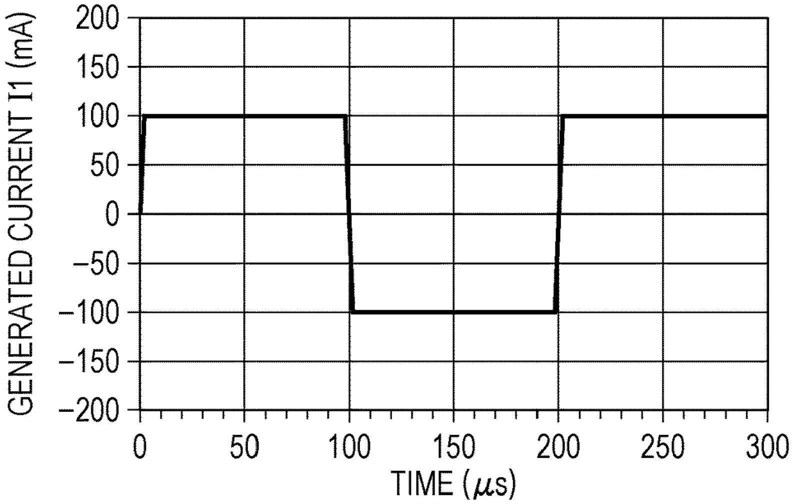
FIG. 8A is a graph illustrating one example of the waveform of a generated current according to a second embodiment.
Figure 8B:
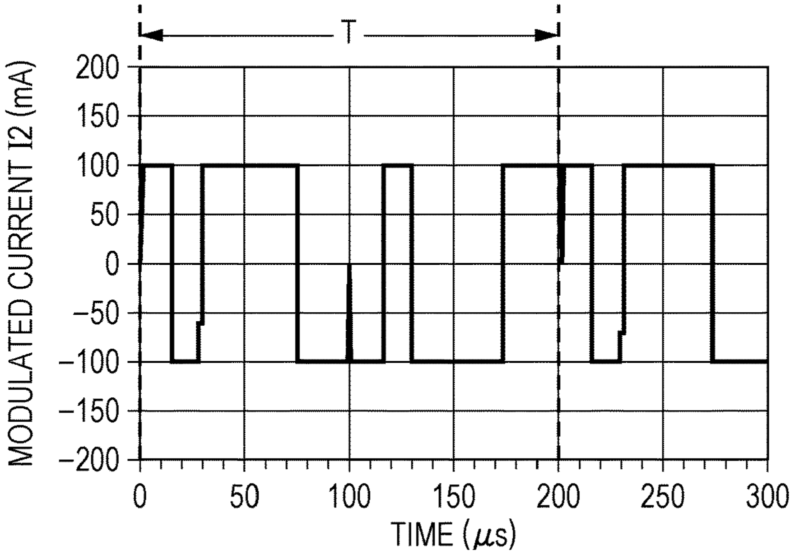
FIG. 8B is a graph illustrating one example of the waveform of a modulated current according to the second embodiment.
Figure 8C:
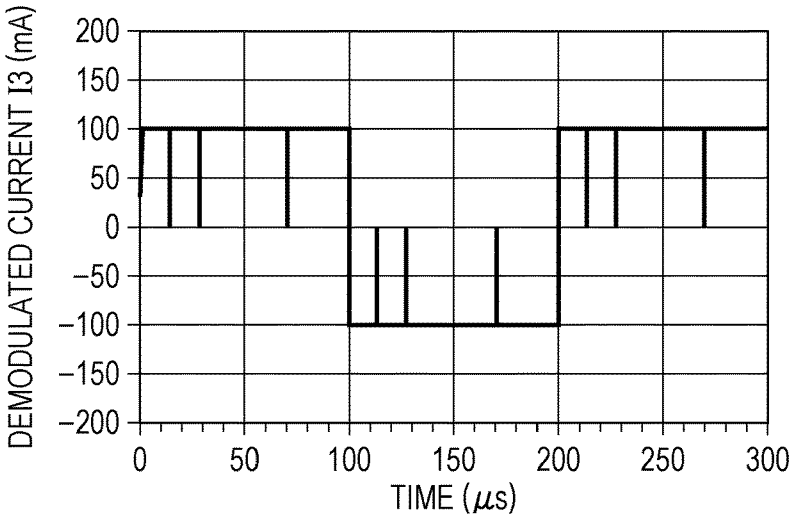
FIG. 8C is a graph illustrating one example of the waveform of a demodulated current according to the second embodiment.

FIGS. 8A to 8C illustrate examples of the waveforms of a generated current I1, a modulated current I2, and a demodulated current I3, respectively.

The generated current I1 illustrated in FIG. 8A was an alternating current having a rectangular waveform with a frequency of 5 kHz. The modulated current I2 illustrated in FIG. 8B was obtained by multiplying the generated current I1 by the modulation code M1. The modulated current I2 illustrated in FIG. 8B was an alternating current. The demodulated current I3 illustrated in FIG. 8C was obtained by multiplying the modulated current I2 by the demodulation code D1. The modulation code M1 and the demodulation code D1 were the same as those described in the first embodiment. As illustrated in FIG. 8C, an alternating current equivalent to the generated current I1 was restored as the demodulated current I3 through the code modulation and the code demodulation.

Accordingly, even when the generated power is alternating-current power, the power can be transmitted with high transmission efficiency, as in the case in which the generated power is direct-current power.

[2. Code Modulator and Code Demodulator]

Figure 9:
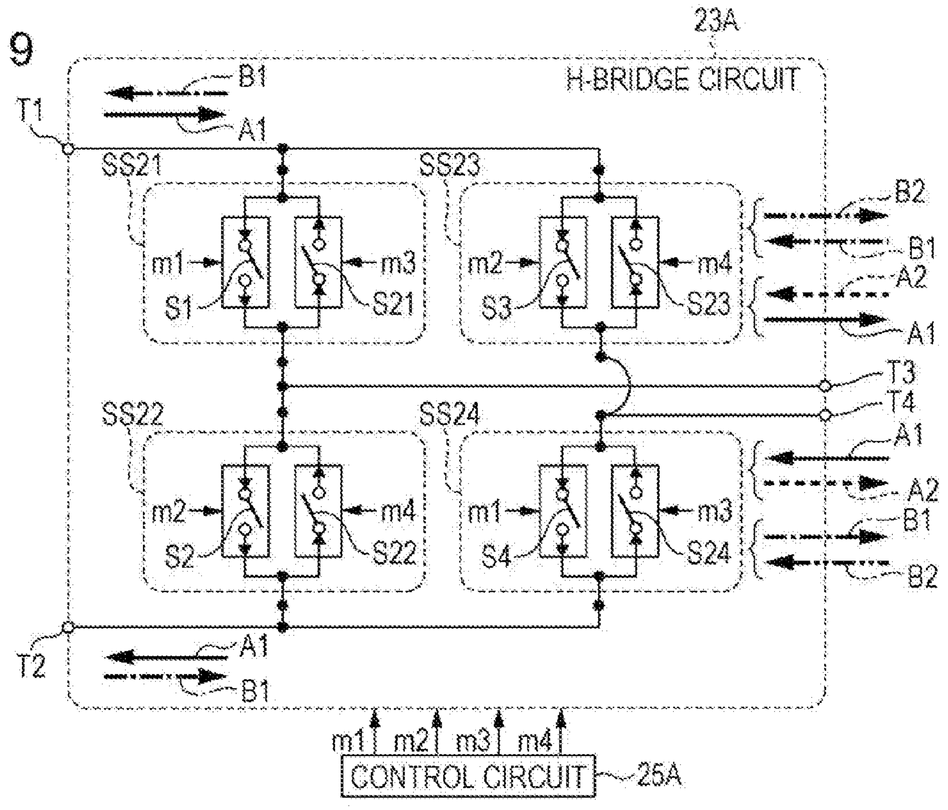
FIG. 9 is a schematic circuit diagram illustrating one example of the configuration a code modulator according to the second embodiment.

FIG. 9 illustrates an example configuration of a control circuit 25A and an H-bridge circuit 23A in the code modulator 2 according to the second embodiment. The circuit illustrated in FIG. 9 differs from the circuit illustrated in FIG. 7 in the following points.

(1) The switch circuits SS1 to SS4 illustrated in FIG. 7 are replaced with bidirectional switch circuits SS21 to SS24.

(2) The control circuit 25 illustrated in FIG. 7 is replaced with the control circuit 25A. The control circuit 25A outputs code sequences m1 to m4 to the H-bridge circuit 23A as control signals.

The switch circuit SS21 includes, in addition to a switch S1 as illustrated in FIG. 7, a switch S21 connected in a direction opposite to and in parallel with the switch S1. The switch S21 is turned on or off in response to the control signal m3. The switch circuit SS22 includes, in addition to a switch S2 as illustrated in FIG. 7, a switch S22 connected in a direction opposite to and in parallel with the switch S2. The switch S22 is turned on or off in response to the control signal m4. The switch circuit SS23 includes, in addition to a switch S3 las illustrated in FIG. 7, a switch S23 connected in a direction opposite to and in parallel with the switch S3. The switch S23 is turned on or off in response to the control signal m4. The switch circuit SS24 includes, in addition to a switch S4 as illustrated in FIG. 7, a switch S24 connected in a direction opposite to and in parallel with the switch S4. The switch S24 is turned on or off in response to the control signal m3.

The switches S21 to S24 are, for example, MOS transistors.

Figure 10:
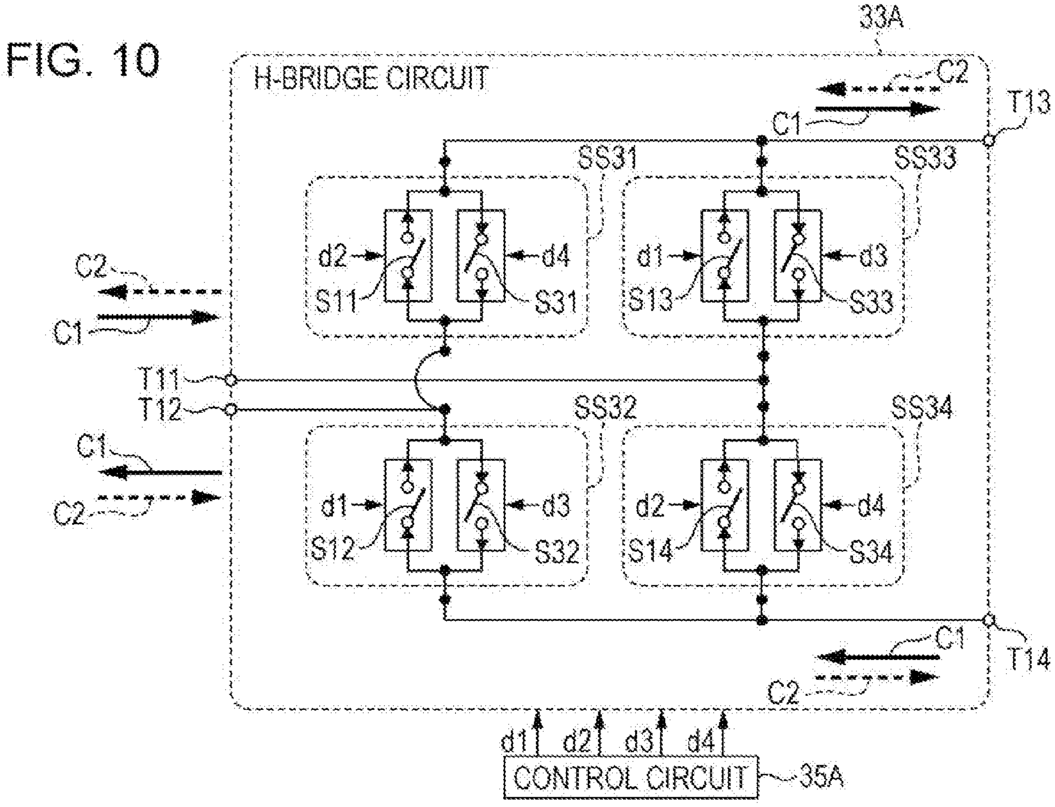
FIG. 10 is a schematic circuit diagram illustrating one example of the configuration of a code demodulator according to the second embodiment.

FIG. 10 illustrates an example configuration of a control circuit 35A and an H-bridge circuit 33A in the code demodulator 4 according to the second embodiment. The circuit illustrated in FIG. 10 differs from the circuit illustrated in FIG. 7 in the following points.

(1) The switch circuits SS11 to SS14 illustrated in FIG. 7 are replaced with bidirectional switch circuits SS31 to SS34.

(2) The control circuit 35 illustrated in FIG. 7 is replaced with the control circuit 35A. The control circuit 35A outputs code sequences d1 to d4 to the H-bridge circuit 33A as control signals.

The switch circuit SS31 includes, in addition to a switch S11 as illustrated in FIG. 7, a switch S31 connected in a direction opposite to and in parallel with the switch S11. The switch S31 is turned on or off in response to the control signal d4. The switch circuit SS32 includes, in addition to a switch S12 as illustrated in FIG. 7, a switch S32 connected in a direction opposite to and in parallel with the switch S12. The switch S32 is turned on or off in response to the control signal d3. The switch circuit SS33 includes, in addition to a switch S13 as illustrated in FIG. 7, a switch S33 connected in a direction opposite to and in parallel with the switch S13. The switch S33 is turned on or off in response to the control signal d3. The switch circuit SS34 includes, in addition to a switch S14 as illustrated in FIG. 7, a switch S34 connected in a direction opposite to and in parallel with the switch S14. The switch S34 is turned on or off in response to the control signal d4.

The switches S31 to S34 are, for example, MOS transistors.

[3. Operation]

[3-1. Control Signals]

Table 3 illustrates examples of the code sequences of the control signals m1 to m4 input to the switches S1 to S4 and S21 to S24 in the code modulator 2 and examples of the code sequences of the control signals d1 to d4 input to the switches S11 to S14 and S31 to S34 in the code demodulator 4.

TABLE 3

| CONTROL SIGNAL | CODE SEQUENCE |
|---|---|
| m1 | [c1a c0] = [1 0 1 1 1 0 0 0 0 0 0 0 0 0] |
| m2 | [c1b c0] = [0 1 0 0 0 1 1 0 0 0 0 0 0 0] |
| m3 | [c0 c1a] = [0 0 0 0 0 0 0 1 0 1 1 1 0 0] |
| m4 | [c0 c1b] = [0 0 0 0 0 0 0 0 1 0 0 0 1 1] |
| d1 | [c1a c0] = [1 0 1 1 1 0 0 0 0 0 0 0 0 0] |
| d2 | [c1b c0] = [0 1 0 0 0 1 1 0 0 0 0 0 0 0] |
| d3 | [c0 c1a] = [0 0 0 0 0 0 0 1 0 1 1 1 0 0] |
| d4 | [c0 c1b] = [0 0 0 0 0 0 0 0 1 0 0 0 1 1] |

In this example, the code sequences of the control signals m1, m2, m3, and m4 are the same as the code sequences of the control signals d1, d2, d3, and d4, respectively. In Table 3, the code sequence c1*b* is a code sequence obtained by inverting all bits of the code sequence c1*a*, and a code sequence c0 is a code sequence in which all bits are 0s. The time span of the code sequences c1*a*, c1*b*, and c0 matches the half cycle of the generated alternating current I1.

[3-2. Operation of Code Modulator]

A description will be given of the operation of the code modulator 2. Now, suppose a case in which the generated current I1 becomes positive in a first half cycle (i.e., a front half of one cycle) and becomes negative in a second half cycle (i.e., a last half of one cycle).

[3-2-1. Operation of Code Modulator in First Half Cycle]

In the first half cycle, the switches S1 to S4 are turned on or off in accordance with the control signals m1 and m2, and the switches S21 to S24 are maintained in the OFF state.

When the control signal m1 indicates “1”, and the control signal m2 indicates “0”, the switches S1 and S4 are in the ON state, and the switches S2 and S3 are in the OFF state. At this point in time, a positive generated current I1 flows in the direction indicated by arrow A1 in FIG. 9, so that a positive modulated current I2 flows to the terminals T3 and T4. That is, the generated current I1 is code-modulated with “1”.

On the other hand, when the control signal m1 indicates “0”, and the control signal m2 indicates “1”, the switches S1 and S4 are in the OFF state, and the switches S2 and S3 are in the ON state. At this point in time, a positive generated current I1 flows in the direction indicated by arrow A2 in FIG. 9, so that a negative modulated current I2 flows to the terminals T3 and T4. That is, the generated current I1 is code-modulated with “−1”.

Thus, in the first half cycle, the code modulator 2 outputs a modulated alternating current I2 to the transmission path 3 via the terminals T3 and T4.

[3-2-2. Operation of Code Modulator in Second Half Cycle]

In the second half cycle, the switches S1 to S4 are maintained in the OFF state, and the switches S21 to S24 are turned on or off in accordance with the control signals m3 and m4.

When the control signal m3 indicates “1”, and the control signal m4 indicates “0”, the switches S21 and S24 are in the ON state, and the switches S22 and S23 are in the OFF state. At this point in time, a negative generated current I1 input to the code modulator 2 flows in the direction indicated by arrow B1 in FIG. 9, so that a negative modulated current I2 flows to the terminals T3 and T4. That is, the generated current I1 is code-modulated with “1”.

On the other hand, when the control signal m3 indicates “0”, and the control signal m4 indicates “1”, the switches S21 and S24 are in the OFF state, and the switches S22 and S23 are in the ON state. At this point in time, a negative generated current I1 input to the code modulator 2 flows in the direction indicated by arrow B2 in FIG. 9, so that a positive modulated current I2 flows to the terminals T3 and T4. That is, the generated current I1 is code-modulated with “−1”.

Accordingly, in the second half cycle, the code modulator 2 also outputs a modulated alternating current I2 to the transmission path 3 via the terminals T3 and T4.

[3-2-3. Supplementary]

The series of switching operations based on the control signals m1 to m4 shown in Table 2 corresponds to an operation for code-modulating the generated current I1 with a modulation code Mb given by:

$$Mb=[1\ -1\ 1\ 1\ 1\ -1\ -1\ 1\ -1\ 1\ 1\ 1\ -1\ -1] \quad (6)$$

In the modulation code Mb, the number of “1s” is larger than the number of “−1 s”. However, the average of the modulated current I2 can become 0. This is because the generated current I1 is positive in the first half cycle and is negative in the second half cycle, and a partial sequence of the modulation code Mb in the first half cycle and a partial sequence of the modulation code Mb in the second half cycle are the same.

[3-3. Operation of Code Demodulator]

A description will be given of the operation of the code demodulator 4.

[3-3-1. Operation of Code Demodulator in First Half Cycle]

In the first half cycle, the switches S11 to S14 are turned on or off in accordance with the control signals d1 and d2, and the switches S31 to S34 are maintained in the OFF state.

When a positive modulated current I2 is input to the code demodulator 4 in the first half cycle, the control signal d1 indicatges “1”, and the control signal d2 indicates “0”. At this point in time, the switches S12 and S13 are in the ON state, and the switches S11 and S14 are in the OFF state. Thus, the positive modulated current I2 flows in the direction indicated by arrow C1 in FIG. 10, and a positive demodulated current I3 flows to the terminals T13 and T14. That is, the modulated current I2 is code-demodulated with “1”.

In the first half cycle, when the negative modulated current I2 is input to the code demodulator 4, the control signal d1 indicates “0”, and the control signal d2 indicates “1”. At this point in time, the switches S12 and S13 are in the OFF state, and the switches S11 and S14 are in the ON state. Thus, a negative modulated current I2 flows in the direction indicated by arrow C1 in FIG. 10, and a positive demodulated current I3 flows to the terminals T13 and T14. That is, the modulated current I2 is code-demodulated with “−1”.

Thus, the code demodulator 4 outputs the positive demodulated current I3 via the terminals T13 and T14 in the first half cycle.

[3-3-2. Operation of Code Demodulator in Second Half Cycle]

In the second half cycle, the switches S11 to S14 are maintained in the OFF state, and the switches S31 to S34 are turned on or off in accordance with the control signals d3 and d4.

In the second half cycle, when a positive modulated current I2 is input to the code demodulator 4, the control signal d3 indicates “1”, and the control signal d4 indicates “0”. At this point in time, the switches S32 and S33 are in the ON state, and the switches S31 and S34 are in the OFF state. Thus, the positive modulated current I2 flows in the direction indicated by arrow C2 in FIG. 10, and a negative demodulated current I3 flows to the terminals T13 and T14. That is, the modulated current I2 is code-demodulated with “−1”.

In the second half cycle, when the negative modulated current I2 is input to the code demodulator 4, the control signal d3 indicates “0”, and the control signal d4 indicates “1”. At this point in time, the switches S32 and S33 are in the OFF state, and the switches S31 and S34 are in the ON state. Thus, a negative modulated current I2 flows in the direction indicated by arrow C2 in FIG. 10, and the negative demodulated current I3 flows to the terminals T13 and T14. That is, the modulated current I2 is code-demodulated with “1”.

Accordingly, the code demodulator 4 outputs the negative demodulated current I3 via the terminals T13 and T14 in the second half cycle. In other words, the code demodulator 4 generates, as the demodulated current I3, an alternating current that is positive in the first half cycle and is negative in the second half cycle, and the waveform of the alternating current generally matches the waveform of the generated current I1.

[3-3-3. Supplementary]

The series of switching operations based on the control signals d1 to d4 shown in Table 2 corresponds to an operation of code-demodulating the modulated current I2 with a demodulation code Db:

$$Db=[1\ -1\ 1\ 1\ 1\ -1\ -1\ 1\ -1\ 1\ 1\ 1\ -1\ -1] \quad (7)$$

[4. Modification of Operation]

Table 4 illustrates other examples of the code sequences of the control signals m1 to m4 input to the switches S1 to S4 and S21 to S24 in the code modulator 2 and other examples of the code sequences of the control signals d1 to d4 input to switches S11 to S14 and S31 to S34 in the code demodulator 4.

TABLE 4

| CONTROL SIGNAL | CODE SEQUENCE |
|---|---|
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| m3 | [c0 c0] = [0 0 0 0 0 0 0 0 0 0 0 0 0 0] |
| m4 | [c0 c0] = [0 0 0 0 0 0 0 0 0 0 0 0 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |
| d3 | [c0 c0] = [0 0 0 0 0 0 0 0 0 0 0 0 0 0] |
| d4 | [c0 c0] = [0 0 0 0 0 0 0 0 0 0 0 0 0 0] |

The control signals m3, m4, d3, and d4 shown in Table 4 maintain the switches S21 to S24 and S31 to S34 in the OFF state. Thus, the H-bridge circuit 23A illustrated in FIG. 9 and the H-bridge circuit 33A illustrated in FIG. 10 are the substantially the same as the H-bridge circuit 23 and the H-bridge circuit 33, respectively, illustrated in FIG. 7.

In addition, the control signals m1, m2, d1, and d2 shown in Table 4 are the same as the control signals m1, m2, d1, and d2 shown in Table 2. Thus, the code modulator 2 and the code demodulator 4 in the present embodiment can realize direct-current-power modulation and demodulation like those described above in the first embodiment.

Accordingly, when the control signals are changed, the code modulator and the code demodulator according to the present embodiment can deal with both direct-current-power modulation and demodulation and alternating-current-power modulation and demodulation.

When the electric generator 1 generates direct-current power, it may be, for example, a photovoltaic generator. When the electric generator 1 generates alternating-current power, it may be, for example, an electric generator utilizing turbine rotation. Examples of such an electric generator include a fossil-fuel power station, a hydropower station, a wind power generator, a nuclear power station, and a tidal power station.

[5. Modifications of Code Modulator and Code Demodulator]

Figure 11:
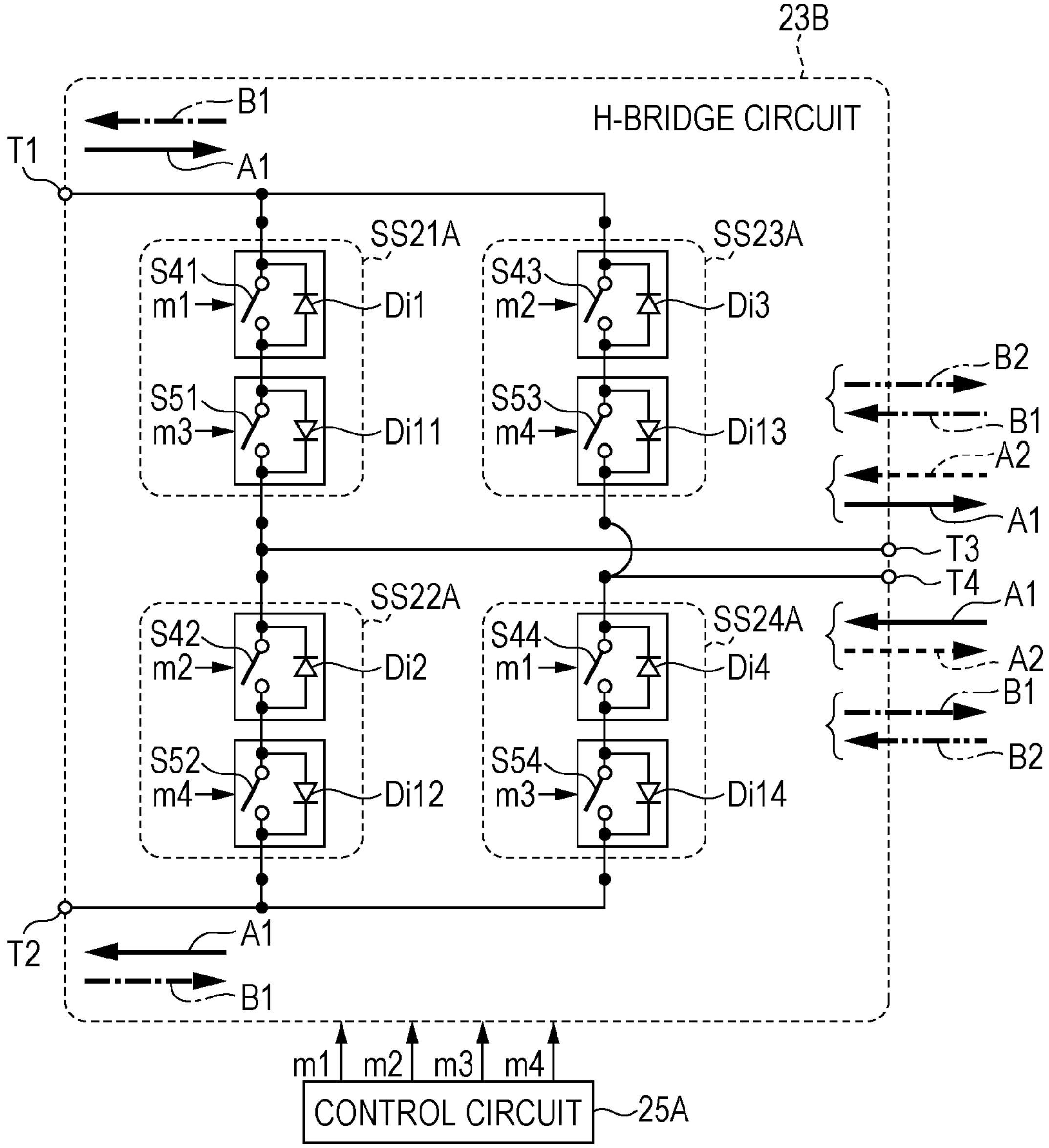
FIG. 11 is a schematic circuit diagram illustrating the configuration of a code modulator according to a modification of the second embodiment.

FIG. 11 illustrates a modification of the H-bridge circuit 23 in the code modulator 2 according to the second embodiment. The H-bridge circuit 23B illustrated in FIG. 11 includes bidirectional switch circuits SS21A to SS24A instead of the bidirectional switch circuits SS21 to SS24 illustrated in FIG. 9.

The bidirectional switch circuit SS21A includes switches S41 and S51 and diodes Di1 and Di11. The switches S41 and S51 are connected in series with each other. The diode Di1 is connected in parallel with the switch S41. The diode Di11 is connected in parallel with the switch S51. The diode Di1 passes current from a terminal T3 to a terminal T1. The diode Di11 passes current from the terminal T1 to the terminal T3. Since the bidirectional switch circuits SS22A to 5524A have structures that are the same as or similar to that of the bidirectional switch circuit SS21A, descriptions thereof are not given hereinafter.

The control circuit 25A outputs a control signal m1 to the switches S41 and S44, outputs a control signal m2 to the switches S42 and S43, outputs a control signal m3 to the switches S51 and S54, and outputs a control signal m4 to the switches S52 and S53. The control signals m1 to m4 may be, for example, the control signals shown in Table 3.

Figure 12:
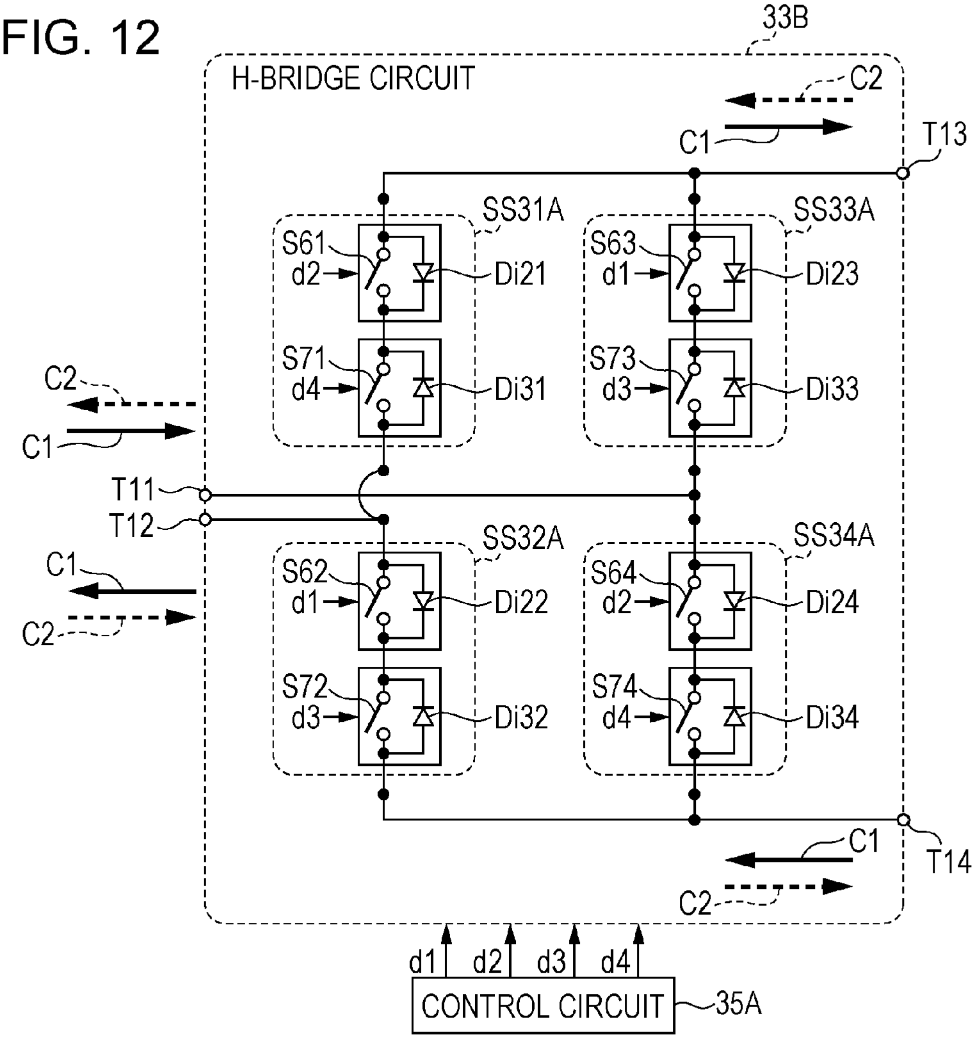
FIG. 12 is a schematic circuit diagram illustrating the configuration of a code demodulator according to a modification of the second embodiment.

FIG. 12 illustrates a modification of the H-bridge circuit 33 in the code demodulator 4 according to the second embodiment. The H-bridge circuit 33B illustrated in FIG. 12 includes bidirectional switch circuits SS31A to SS34A instead of the bidirectional switch circuits SS31 to SS34 illustrated in FIG. 10.

The bidirectional switch circuit SS31A includes switches S61 and S71 and diodes Di21 and Di31. The switches S61 and S71 are connected in series with each other. The diode Di21 is connected in parallel with the switch S61. The diode Di31 is connected in parallel with the switch S71. The diode Di21 passes current from a terminal T13 to a terminal T12. The diode Di31 passes current from the terminal T12 to the terminal T13. Since bidirectional switch circuits SS32A to 5534A have structures that are same as or similar to that of the bidirectional switch circuit SS31A, descriptions thereof are not given hereinafter.

The control circuit 35A outputs a control signal d1 to switches S62 and S63, outputs a control signal d2 to the switches S61 and S64, outputs a control signal d3 to switches S72 and S73, and outputs a control signal d4 to the switches S71 and S74. The control signals d1 to d4 may be, for example, those shown in Table 3.

The switches S41 to S44, S51 to S54, S61 to S64, and S71 to S74 may be, for example, MOS transistors. In this case, the diodes Di1 to Di4, Di11 to Di14, Di21 to Di24, and Di31 to Di34 may be, for example, body diodes of the MOS transistors. This makes it possible to miniaturize the bidirectional switches SS21A to SS24A and SS31A to SS34A.

Third Embodiment

[1. Power Transmission System]

Figure 13:
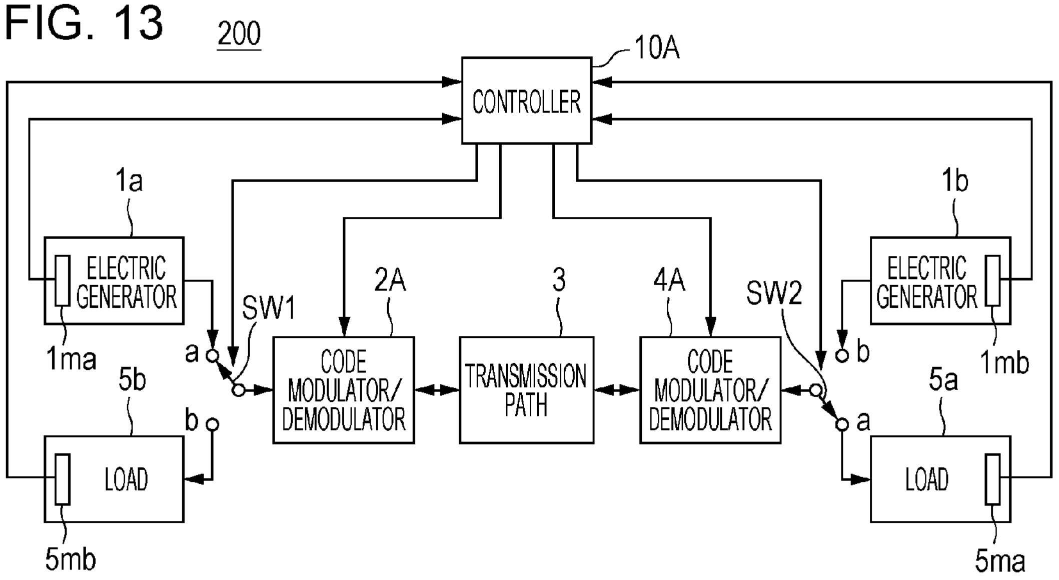
FIG. 13 is a block diagram illustrating an example configuration of a power transmission system according to a third embodiment.

FIG. 13 illustrates an example configuration of a power transmission system 200 according to a third embodiment.

The power transmission system 200 illustrated in FIG. 13 includes an electric generator 1*a*, a load 5*b*, a switch SW1, a code modulator/demodulator 2A, a transmission path 3, an electric generator 1*b*, a load 5*a*, a switch SW2, a code modulator/demodulator 4A, and a controller 10A.

The electric generator 1*a* includes a power measuring instrument 1*ma*, and the electric generator 1*b* includes a power measuring instrument 1*mb*. The load 5*a* includes a power measuring instrument 5*ma*, and the load 5*b* includes a power measuring instrument 5*mb*.

The electric generators 1*a* and 1*b* are, for example, substantially the same as the electric generator 1 described above in the first embodiment. The loads 5*a* are 5*b*, for example, substantially the same as the load 5 described above in the first embodiment.

The switch SW1 connects the code modulator/demodulator 2A to one of the electric generator 1*a* and the load 5*b*. The switch SW2 connects the code modulator/demodulator 4A to one of the electric generator 1*b* and the load 5*a*.

Each of the code modulator/demodulator 2A and the code modulator/demodulator 4A includes bidirectional switch circuits. The code modulator/demodulator 2A may include, for example, the H-bridge circuit 23A illustrated in FIG. 9. The code modulator/demodulator 4A may include, for example, the H-bridge circuit 33A illustrated in FIG. 10. As can be understood from the symmetry between the structure of the circuit illustrated in FIG. 9 and the structure of the circuit illustrated in FIG. 10, the H-bridge circuit 23A illustrated in FIG. 9 can code-demodulate modulated power input from the terminals T3 and T4, and the H-bridge circuit 33A illustrated in FIG. 10 can code-modulate generated power input from the terminals T13 and T14.

The controller 10A obtains information about the amounts of power from the power measuring instruments 1*ma*, 1*mb*, 5*ma*, and 5*mb*. On the basis of the information, the controller 10A controls the switches SW1 and SW2. The controller 10A causes one of the code modulator/demodulator 2A and the code modulator/demodulator 4A to operate as a code modulator and causes the other code modulator/demodulator to operate as a code demodulator.

[2. Operation]

A description will be given of the operation of the power transmission system 200.

In a first mode, the controller 10A causes the switches SW1 and SW2 to connect corresponding contact points a, causes the code modulator/demodulator 2A to operate as a code modulator, and causes the code modulator/demodulator 4A to operate as a code demodulator. In this state, the electric generator 1*a* transmits power to the code modulator/demodulator 2A. The code modulator/demodulator 2A code-modulates the power and transmits the modulated power to the code modulator/demodulator 4A through the transmission path 3. The code modulator/demodulator 4A code-demodulates the modulated power and supplies demodulated power to the load 5*a*.

In a second mode, the controller 10A causes the switches SW1 and SW2 to connect to corresponding contact points b, causes the code modulator/demodulator 2A to operate as a code demodulator, causes the code modulator/demodulator 4A to operate as a code modulator. In this state, the electric generator 1*b* transmits power to the code modulator/demodulator 4A. The code modulator/demodulator 4A code-modulates the power and transmits modulated power to the code modulator/demodulator 2A through the transmission path 3. The code modulator/demodulator 2A code-demodulates the modulated power and supplies demodulated power to the load 5*b*.

As described above, the power transmission system 200 can realize bidirectional power transmission. Thus, depending on the situation, power can be efficiently transmitted from equipment having excessive power to equipment that requires power. Thus, it is possible to improve the energy efficiency of the entire power transmission system. The direction in which power is transmitted can be, for example, arbitrarily selected in a time-division manner.

[3. Modification of Power Transmission System]

Figure 14:
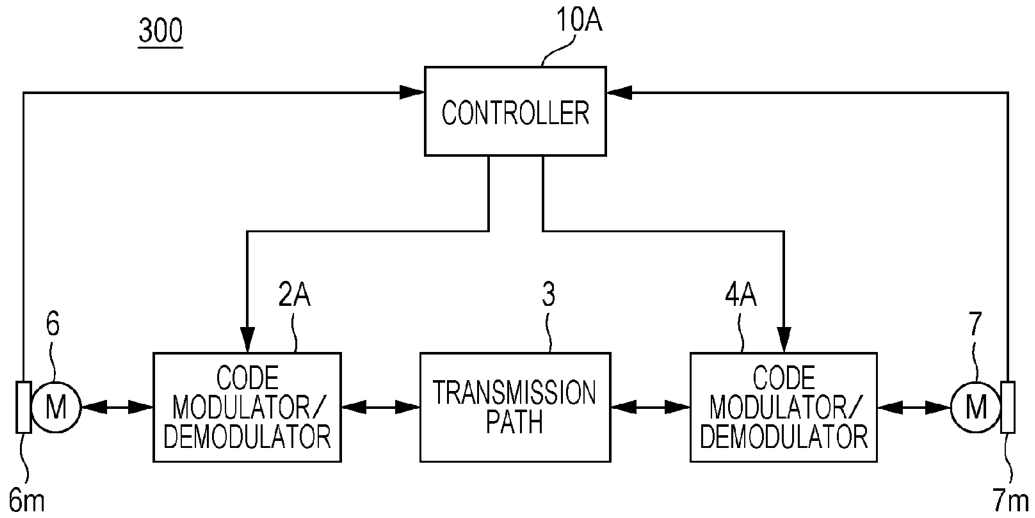
FIG. 14 is a block diagram illustrating the configuration of a power transmission system according to a modification of the third embodiment.

FIG. 14 illustrates the configuration of a power transmission system 300 according to a modification of the third embodiment. The power transmission system 300 illustrated in FIG. 14 differs from the power transmission system 200 illustrated in FIG. 13 in the following points.

(1) The electric generator 1*a*, the load 5*b*, and the switch SW1 are replaced with a rotating device 6, and the electric generator 1*b*, the load 5*a*, and the switch SW2 are replaced with a rotating device 7.

(2) The rotating devices 6 and 7 include power measuring instruments 6*m* and 7*m*, respectively. The controller 10A obtains information about the amounts of power from the power measuring instruments 6*m* and 7*m* and controls the operations of the code modulator/demodulator 2A and the code modulator/demodulator 4A on the basis of the obtained information.

When the rotating device 6 operates as an electric generator, and the rotating device 7 operates as an electric motor, the code modulator/demodulator 2A operates as a code modulator, and the code modulator/demodulator 4A operates as a code demodulator. On the other hand, when the rotating device 7 operates as an electric generator, and the rotating device 6 operates as an electric motor, the code modulator/demodulator 4A operates as a code modulator, and the code modulator/demodulator 2A operates as a code demodulator.

The rotating device 6 or 7 may also be replaced with, for example, a load circuit.

Fourth Embodiment

[1. Power Transmission System]

Figure 15:
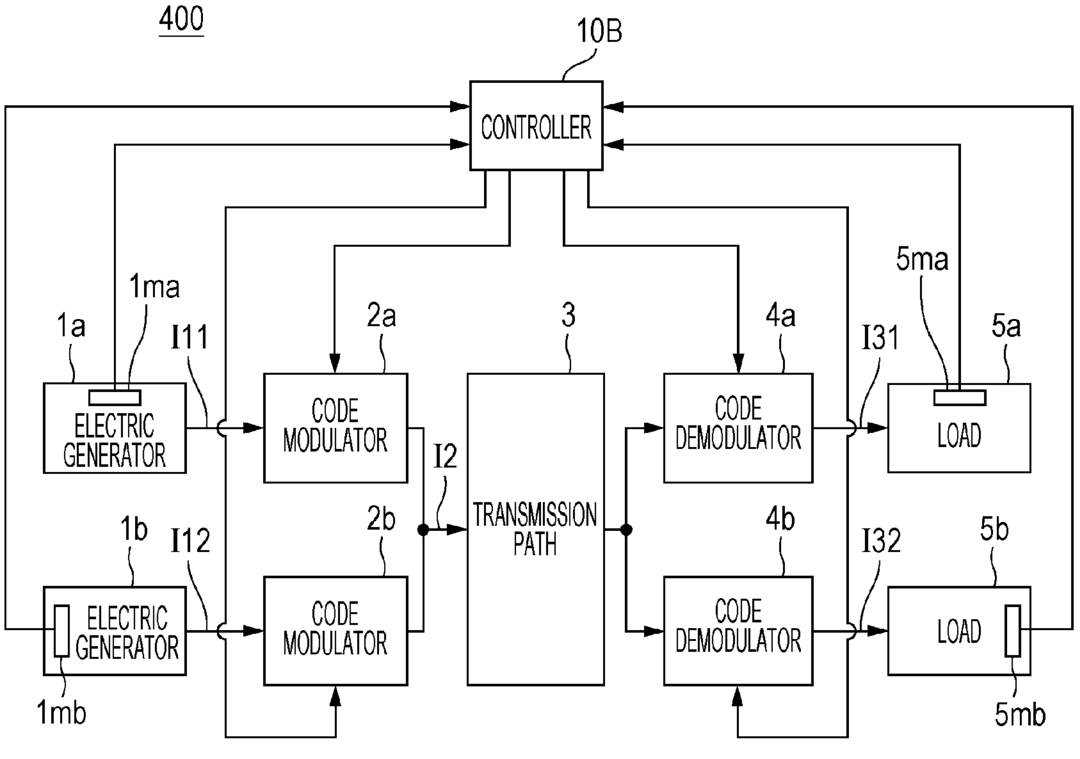
FIG. 15 is a block diagram illustrating an example configuration of a power transmission system according to a fourth embodiment.

FIG. 15 illustrates an example configuration of a power transmission system 400 according to a fourth embodiment.

The power transmission system 400 includes electric generators 1*a* and 1*b*, code modulators 2*a* and 2*b*, a transmission path 3, code demodulators 4*a* and 4*b*, loads 5*a* and 5*b*, and a controller 10B.

Although, in the example illustrated in FIG. 15, the power transmission system 400 has two electric generators 1*a* and 1*b* and two loads 5*a* and 5*b*, the number of electric generators and the number of loads are not limited thereto. The power transmission system 400 may include three or more electric generators and three or more loads.

The controller 10B obtains information about the amounts of electricity generated by the electric generators 1*a* and 1*b* from the power measuring instruments 1*ma* and 1*mb* and obtains information about the amounts of power consumed by the loads 5*a* and 5*b* from the power measuring instruments 5*ma* and 5*mb*. On the basis of these pieces of information, the controller 10B controls the code modulators 2*a* and 2*b* and the code demodulators 4*a* and 4*b*. For example, the controller 10B sends instruction signals to the code modulators 2*a* and 2*b* and the code demodulators 4*a* and 4*b*. The instruction signals include synchronization signals for the code modulators 2*a* and 2*b* and the code demodulators 4*a* and 4*b* to perform synchronization operation. This allows modulation and demodulation of power to synchronize with each other accurately. The instruction signal to the code modulators 2*a* and 2*b* includes code information regarding a modulation code, and the instruction signal to the code demodulators 4*a* and 4*b* includes code information regarding a demodulation code.

For example, the controller 10B may obtain information about instantaneous powers in the code modulators 2*a* and 2*b* and/or the code demodulators 4*a* and 4*b*. The controller 10B may compare the information about the instantaneous power with a modulation code and/or demodulation code. This makes it possible to recognize how much power is transmitted through which route. For example, when the power generation cost differs from one electric generator to another or when the power transmission efficiency differs depending on a power transmission route, it is possible to perform power supply corresponding to an electric generator or a power transmission route. Also, electricity charge corresponding to an electric generator or a power transmission route may be calculated in accordance with the obtained information.

On the basis of the instruction signal, the code modulator 2*a* code-modulates power generated by the electric generator 1*a* and outputs the modulated power to the transmission path 3. On the basis of the instruction signal, the code modulator 2*b* code-modulates power generated by the electric generator 1*b* and outputs the modulated power to the transmission path 3. The modulated powers output from the code modulators 2*a* and 2*b* are combined together and the combined power is transmitted to the code demodulators 4*a* and 4*b* through the transmission path 3. On the basis of the instruction signal, the code demodulator 4*a* code-demodulates the power code-modulated by the code modulator 2*a* and outputs the demodulated power to the load 5*a*. On the basis of the instruction signal, the code demodulator 4*b* code-demodulates the power code-modulated by the code modulator 2*b* and outputs the demodulated power to the load 5*b*.

Thus, power transmission from the electric generator 1*a* to the load 5*a* and power transmission from the electric generator 1*b* to the load 5*b* are concurrently and independently executed through the same transmission path 3.

Since a plurality of powers are transmitted through the same transmission path 3, the transmission path 3 can be simplified. For example, when the transmission path 3 is a cable, it is possible to reduce the number of cables.

Since a plurality of modulated powers are combined and are concurrently transmitted, for example, the transmission time can be reduced compared with a scheme in which powers in a plurality of channels are transmitted in a time-division manner. In addition, according to the code modulation and demodulation scheme, since each power is transmitted independently, the power transmission can be performed without affecting transmission of other power.

Each of the code modulators 2*a* and 2*b* can execute code modulation by using an arbitrary modulation code. Similarly, each of the code demodulators 4*a* and 4*b* can execute code demodulation by using an arbitrary demodulation code. Accordingly, pairing between the code modulators and the code demodulators can be flexibly changed in accordance with an arbitrary combination of a modulation code and a demodulation code. For example, in FIG. 15, power transmission from the electric generator 1*a* to the load 5*b* and power transmission from the electric generator 1*b* to the load 5*a* may be executed concurrently. Even when the number of pairing patterns increases, an increase in the size of the circuit scale may be suppressed. Accordingly, it is possible to realize power transmission with an apparatus having a reduced size.

[2. Code Modulation and Demodulation of Plurality of Powers]

[2-1. Waveforms]

FIGS. 16A, 16B, 16C, 16D, and 16E illustrate examples of the waveforms of a generated current I11, a generated current I12, a modulated current I2, a demodulated current I31, and a demodulated current I32, respectively, illustrated in FIG. 15. In this case, the modulated current I2 corresponds to a combined current obtained by combining a modulated current output from the code modulator 2*a* and a modulated current output from the code modulator 2*a*.

In this measurement, each of the code modulators 2*a* and 2*b* had the configuration illustrated in FIG. 9, and each of the code demodulators 4*a* and 4*b* had the configuration illustrated in FIG. 10. Control signals for the code modulators 2*a* and 2*b* and the code demodulators 4*a* and 4*b* are described later.

Figure 16A:
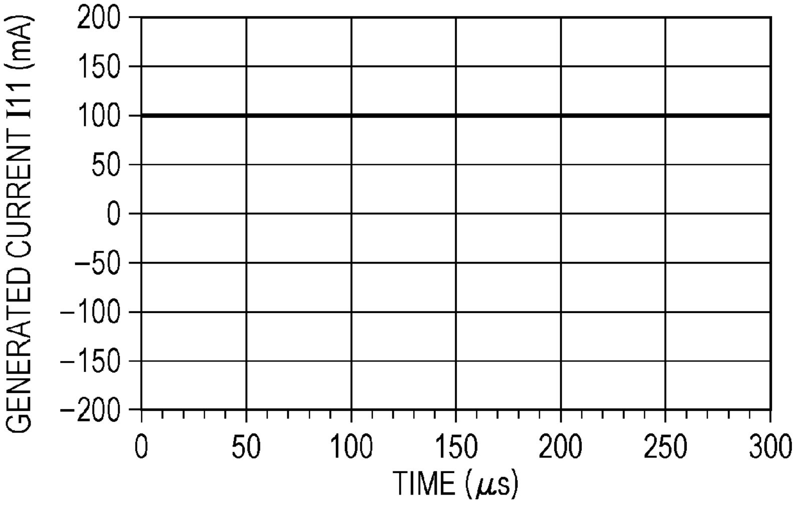
FIG. 16A is a graph illustrating one example of the waveform of a first generated current according to the fourth embodiment.
Figure 16B:
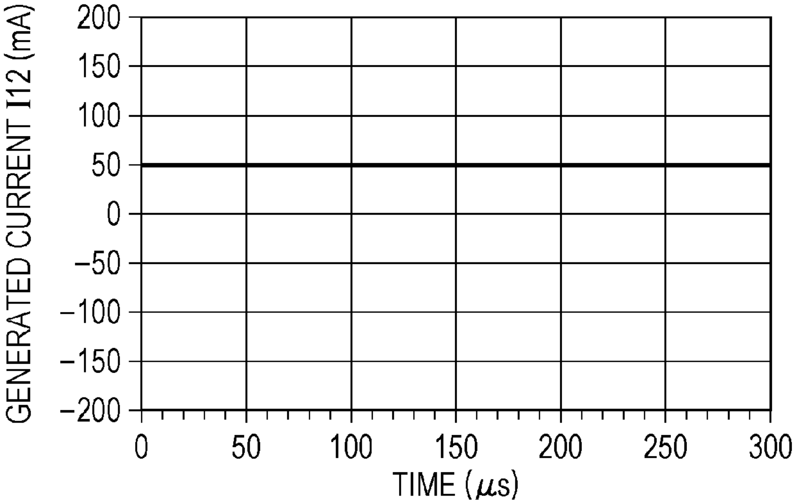
FIG. 16B is a graph illustrating one example of the waveform of a second generated current according to the fourth embodiment.

The generated current I11 illustrated in FIG. 16A was a direct current of 100 mA, and the generated current I12 illustrated in FIG. 16B was a direct current of 50 mA. The modulated current I2 illustrated in FIG. 16C was an alternating current that varies in the range of −150 mA to 150 mA. The demodulated current I31 illustrated in FIG. 16D was a direct current of 100 mA, and the demodulated current I32 illustrated in FIG. 16E was a direct current of 50 mA.

Figure 16C:
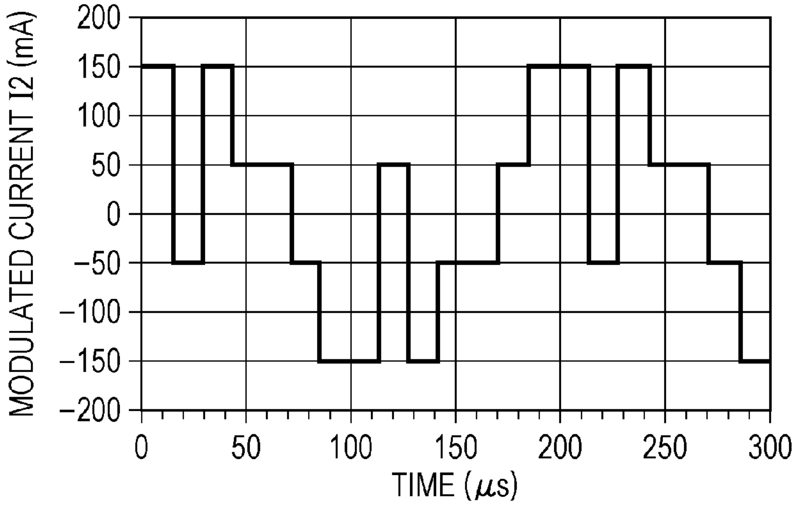
FIG. 16C is a graph illustrating one example of the waveform of a modulated current according to the fourth embodiment.
Figure 16D:
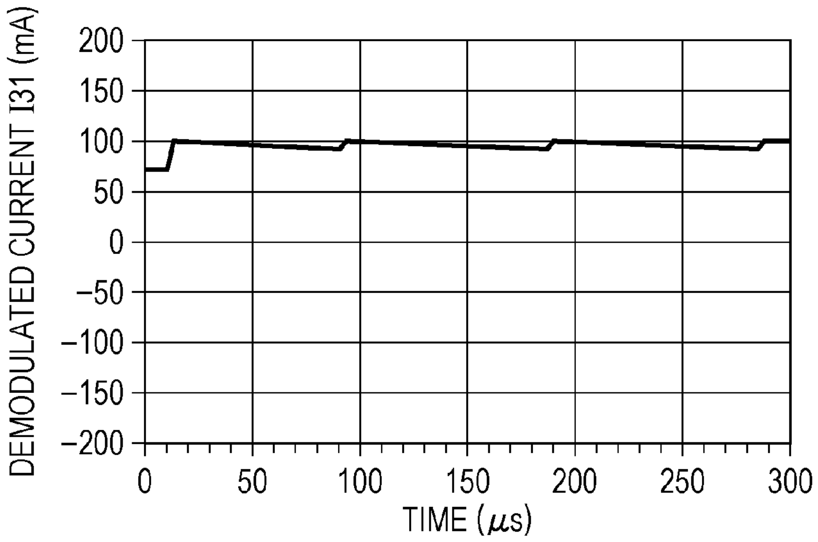
FIG. 16D is a graph illustrating one example of the waveform of a first demodulated current according to the fourth embodiment.
Figure 16E:
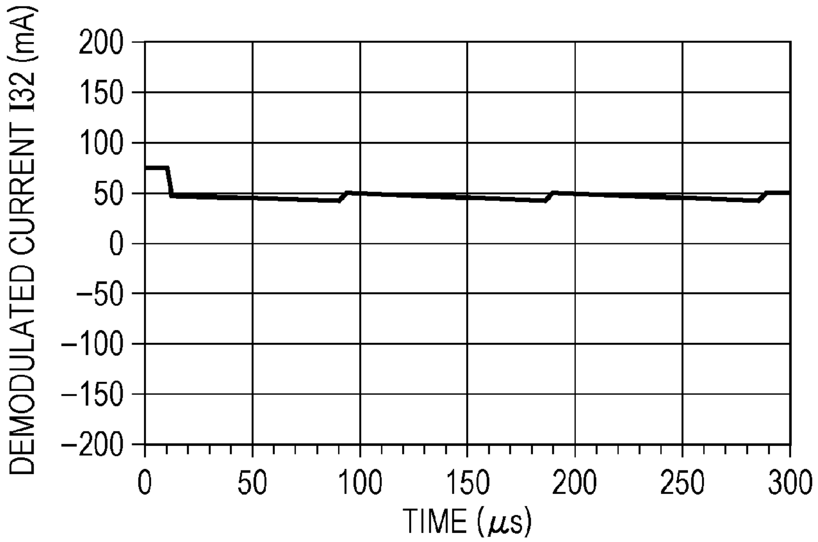
FIG. 16E is a graph illustrating one example of the waveform of a second demodulated current according to the fourth embodiment.

Comparison between FIG. 16A and FIG. 16D shows that the generated current I11 generated by the electric generator 1*a* was transmitted to the load 5*a*. Comparison between FIG. 16B and FIG. 16E shows that the generated current I12 generated by the electric generator 1*b* was transmitted to the load 5*b*.

[2-2. Control Signals]

Control signals m1 to m4 input to the switches S1 to S4 and S21 to S22 in the code modulator 2*a* and control signals d1 to d4 input to the switches S11 to S14 and S31 to S34 in the code demodulator 4*a* had the code sequences shown in Table 4 described above.

Control signals m1 to m4 input to the switches S1 to S4 and S21 to S22 in the code modulator 2*b* and control signals d1 to d4 input to the switches S11 to S14 and S31 to S34 in the code demodulator 4*b* had the code sequences shown in Table 5 described below.

TABLE 5

| CONTROL SIGNAL | CODE SEQUENCE |
|---|---|
| m1 | [c2a c2b] = [1 1 1 0 0 1 0 0 0 0 1 1 0 1] |
| m2 | [c2b c2a] = [0 0 0 1 1 0 1 1 1 1 0 0 1 0] |
| m3 | [c0 c0] = [0 0 0 0 0 0 0 0 0 0 0 0 0 0] |
| m4 | [c0 c0] = [0 0 0 0 0 0 0 0 0 0 0 0 0 0] |
| d1 | [c2a c2b] = [1 1 1 0 0 1 0 0 0 0 1 1 0 1] |
| d2 | [c2b c2a] = [0 0 0 1 1 0 1 1 1 1 0 0 1 0] |
| d3 | [c0 c0] = [0 0 0 0 0 0 0 0 0 0 0 0 0 0] |
| d4 | [c0 c0] = [0 0 0 0 0 0 0 0 0 0 0 0 0 0] |

Since the operations of the code modulator 2*a* and the code demodulator 4*a* have been described above, descriptions thereof are not given hereinafter. Also, since the operations of the code modulator 2*b* and the code demodulator 4*b* are substantially the same as those described above except that the control signals are different, descriptions of the operations are not given hereinafter.

As shown in Tables 4 and 5, the code sequence c1*a* and a code sequence c2*a* were different from each other, and the code sequence c1*b* and a code sequence c2*b* were different from each other. The code sequence c1*a* and the code sequence c2*a* were orthogonal to each other, and the code sequence c1*b* and the code sequence c2*b* were orthogonal to each other. Specifically, the code sequence c1*a* and the code sequence c2*a* were 7-bit orthogonal Gold sequences different from each other, and the code sequence c1*b* and the code sequence c2*b* were 7-bit orthogonal Gold sequences different from each other. Through use of these orthogonal code sequences for the control signals, modulated current components generated by the code modulator 2*a* were code-demodulated by the code demodulator 4*a*, and modulated current components generated by the code modulator 2*b* were code-demodulated by the code demodulator 4*b*, as illustrated in FIGS. 16A to 16E. Thus, the generated currents I11 and I12 were independently transmitted to the loads 5*a* and 5*b*, respectively.

The series of switching operations in the code modulator 2*a* according to the control signals m1 to m4 as shown in Table 4 corresponds to an operation for code-modulating the generated current I11 with the modulation code M1 described above. The series of switching operations in the code demodulator 4*a* according to the control signals d1 to d4 as shown in Table 4 corresponds to an operation for code-modulating the modulated current I2 with the demodulation code D1 described above. The series of switching operations in the code modulator 2*b* according to the control signals m1 to m4 as shown in Table 5 corresponds to an operation for code-modulating the generated current I12 with a modulation code M2 below:

$$M2=[1\ 1\ 1\ -1\ -1\ 1\ -1\ -1\ -1\ -1\ 1\ 1\ -1\ 1] \quad (8)$$

The series of switching operations in the code demodulator 4*b* according to the control signals d1 to d4 as shown in Table 5 corresponds to an operation for code-modulating the modulated current I2 with demodulation code D2 below:

$$D2=[1\ 1\ 1\ -1\ -1\ 1\ -1\ -1\ -1\ -1\ 1\ 1\ -1\ 1] \quad (9)$$

In this case, the front half of the code sequence of the modulation code M1 and the front half of the code sequence of the modulation code M2 are orthogonal Gold sequences that are orthogonal to each other. The last half of the code sequence of the modulation code M1 and the last half of the code sequence of the modulation code M2 are orthogonal Gold sequences that are orthogonal to each other. The front half of the code sequence of the demodulation code D1 and the front half of the code sequence of the demodulation code D2 are orthogonal Gold sequences that are orthogonal to each other. The last half of the code sequence of the demodulation code D1 and the last half of the code sequence of the demodulation code D2 are orthogonal Gold sequences that are orthogonal to each other.

Accordingly, results illustrated in FIGS. 16A to 16E indicate advantages described below.

(A) Since the modulation code includes the orthogonal code, a plurality of modulated powers can be concurrently transmitted through the same transmission path.

(B) Since the demodulation code includes the orthogonal code, a plurality of modulated powers concurrently transmitted through the same transmission path can be appropriately split.

As a result of the above operation, the power transmission system 400 can flexibly transmit power between a plurality of pieces of equipment connected to the plurality of code modulators and a plurality of pieces of equipment connected to the plurality of code demodulators.

[2-4. Modifications]

[2-4-1. Code Modulation and Demodulation of Plurality of Alternating-Current Powers]

In a first modification, the power transmission system 400 allowed a plurality of alternating-current powers to be successfully code-modulated, code-demodulated, and transmitted.

In the first modification, control signals for the code modulator 2a and the code demodulator 4a had the code sequences shown in Table 3 described above, and control signals for the code modulator 2b and the code demodulator 4b had the code sequences shown in Table 6 described below.

TABLE 6

| CONTROL SIGNAL | CODE SEQUENCE |
|---|---|
| m1 | [c2a c0] = [1 1 1 0 0 1 0 0 0 0 0 0 0 0] |
| m2 | [c2b c0] = [0 0 0 1 1 0 1 0 0 0 0 0 0 0] |
| m3 | [c0 c2a] = [0 0 0 0 0 0 0 1 1 1 0 0 1 0] |
| m4 | [c0 c2b] = [0 0 0 0 0 0 0 0 0 0 1 1 0 1] |
| d1 | [c2a c0] = [1 1 1 0 0 1 0 0 0 0 0 0 0 0] |
| d2 | [c2b c0] = [0 0 0 1 1 0 1 0 0 0 0 0 0 0] |
| d3 | [c0 c2a] = [0 0 0 0 0 0 0 1 1 1 0 0 1 0] |
| d4 | [c0 c2b] = [0 0 0 0 0 0 0 0 0 0 1 1 0 1] |

FIGS. 17A, 17B, 17C, 17D, and 17E illustrate examples of the waveforms of a generated current I11, a generated current I12, a modulated current I2, a demodulated current I31, and a demodulated current I32, respectively, according to the first modification.

As is apparent from FIGS. 17A to 17E, the power transmission system 400 allows a plurality of alternating-current powers to be concurrently and independently transmitted.

[2-4-2. Code Modulation and Demodulation of Direct-Current Power and Alternating-Current Power]

In a second modification, the power transmission system 400 allowed direct-current power and alternating-current power to be successfully code-modulated, code-demodulated, and transmitted.

In the second modification, control signals for the code modulator 2a and the code demodulator 4a had the code sequences shown in Table 4 described above, and control signals for the code modulator 2b and the code demodulator 4b had the code sequences shown in Table 6 described above.

FIGS. 18A, 18B, 18C, 18D, and 18E illustrate examples of the waveforms of a generated current I11, a generated current I12, a modulated current I2, a demodulated current I31, and a demodulated current I32, respectively, according to the second modification.

As is apparent from FIGS. 18A to 18E, the power transmission system 400 allows direct-current power and alternating-current power to be concurrently and independently transmitted.

[2-4-3. Code Modulation and Demodulation Involving DC-AC Conversion]

In a third modification, two direct currents were code-modulated into two code-modulated currents, one of the code-modulated currents was then code-demodulated into a direct current, and the other code-modulated current was converted into a predetermined alternating current.

In the third modification, control signals m1 to m4 input to the code modulator 2a and control signals d1 to d4 input to the code demodulator 4a had the code sequences shown in Table 4 described above. Control signals m1 to m4 input to the code modulator 2b had the code sequences shown in Table 5 described above. Control signals d1 to d4 input to the code demodulator 4b had the code sequences shown in Table 6 described above.

Figure 19A:
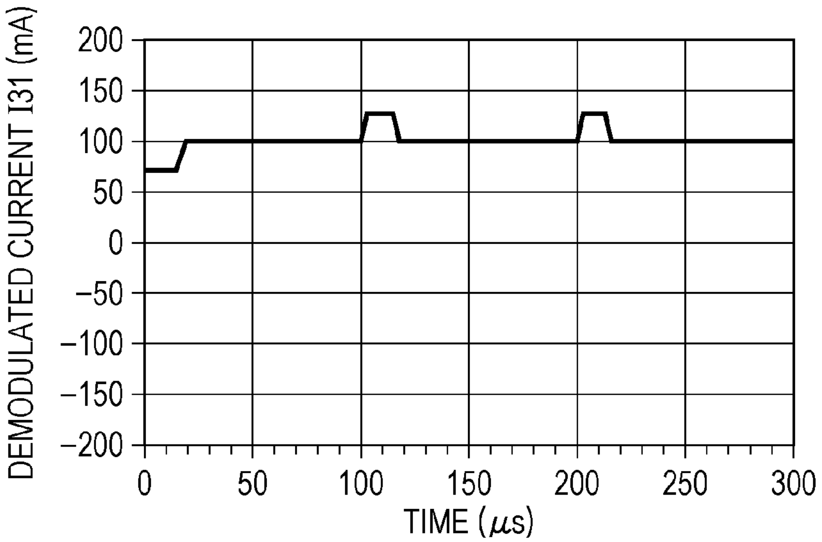
FIG. 19A is a graph illustrating the waveform of a demodulated current according to a third modification of the fourth embodiment.
Figure 19B:
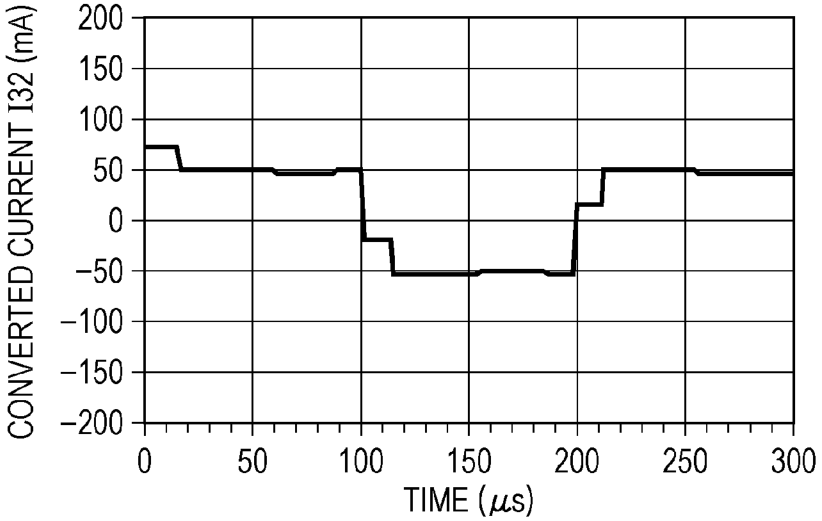
FIG. 19B is a graph illustrating the waveform of a converted current according to the third modification of the fourth embodiment.

The waveforms of a generated current I11, a generated current I12, and a modulated current I2 were analogous to the waveforms illustrated in FIGS. 16A, 16B, and 16C, respectively. FIGS. 19A and 19B illustrate the waveforms of a demodulated current I31 and a converted current I32, respectively.

Comparison between FIG. 16A and FIG. 19A shows that the direct current I11 generated by the electric generator 1a was transmitted to the load 5a through the code modulation and demodulation. Comparison between FIG. 16B and FIG. 19B shows that a direct current I12 generated by the electric generator 1b was transmitted to the load 5b as the alternating current I32 through the code modulation and predetermined conversion.

In this modification, the series of switching operations in the code demodulator 4b corresponds to an operation for converting a modulated current, modulated with the modulation code M2, with a conversion code Dc generated based on the modulation code M2 and given by:

$$Dc=[1\ 1\ 1\ -1\ -1\ 1\ -1\ 1\ 1\ 1\ -1\ -1\ 1\ -1] \quad (10)$$

The code sequence of the conversion code Dc in the first half cycle is the same as the code sequence of the above-described demodulation code D2 in the first half cycle, and the code sequence of the conversion code Dc in the second half cycle corresponds to a code sequence obtained by inverting the polarity of each bit of the code sequence of the above-described demodulation code D2 in the second half cycle. Thus, the conversion code Dc allow an operation for code-demodulating the modulated current I2 and further inverting the polarity thereof to be realized with a single conversion operation. This allows the code demodulator 4*b* to generate the alternating current I32 by using the modulated current I2.

With the arrangement described above, the power transmission system 400 allows a plurality of direct-current powers to be concurrently and independently transmitted. In addition, the transmitted modulated power can be converted into desired alternating-current power.

[2-4-4. Code Modulation and Demodulation Involving AC-DC Conversion]

In a fourth modification, two alternating currents were code-modulated into two code-modulated currents, one of the code-modulated currents was then converted into a predetermined direct current, and the other code-modulated current was code-demodulated.

In the fourth modification, control signals m1 to m4 input to the code modulator 2*a* had the code sequences shown in Table 3 described above. Control signals d1 to d4 input to the code demodulator 4*a* had the code sequences shown in Table 4 described above. Control signals m1 to m4 input to the code modulator 2*b* and control signals d1 to d4 input to the code demodulator 4*b* had the code sequences shown in Table 6 described above.

Figure 17A:
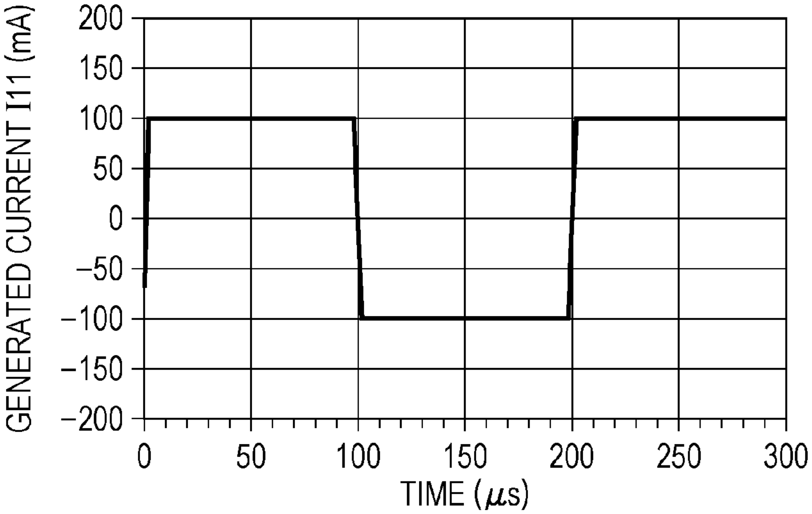
FIG. 17A is a graph illustrating the waveform of a first generated current according to a first modification of the fourth embodiment.
Figure 17B:
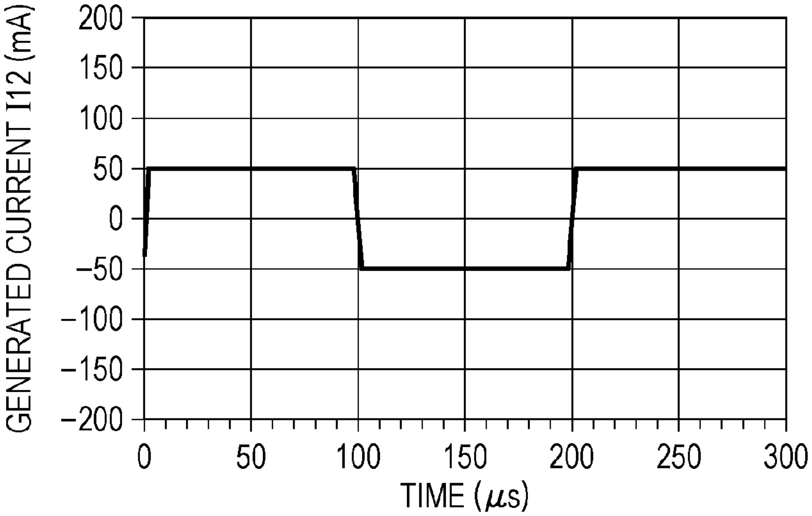
FIG. 17B is a graph illustrating the waveform of a second generated current according to the first modification of the fourth embodiment.
Figure 17C:
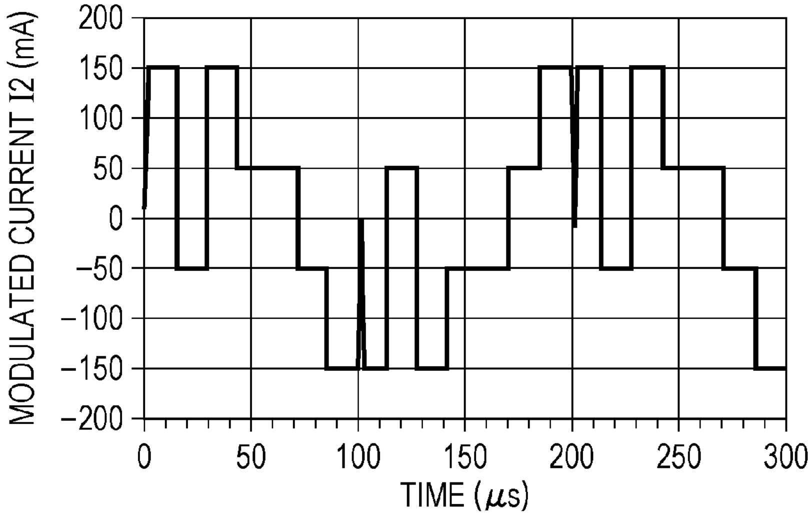
FIG. 17C is a graph illustrating the waveform of a modulated current according to the first modification of the fourth embodiment.
Figure 17D:
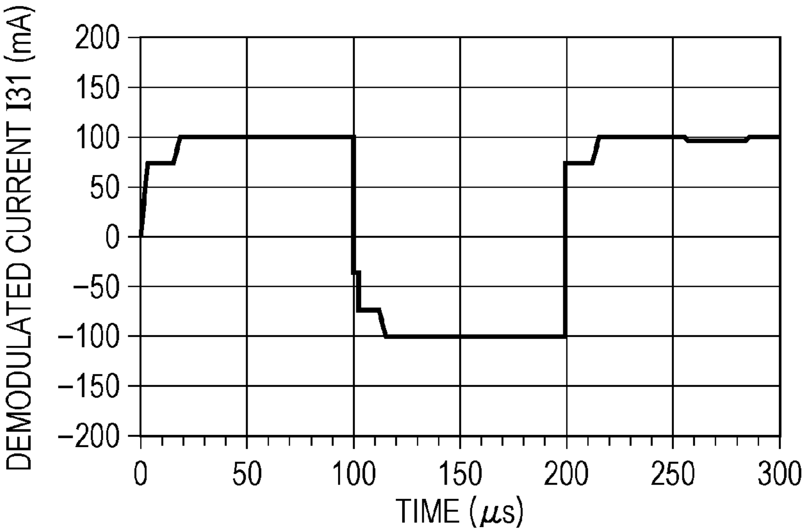
FIG. 17D is a graph illustrating the waveform of a first demodulated current according to the first modification of the fourth embodiment.
Figure 17E:
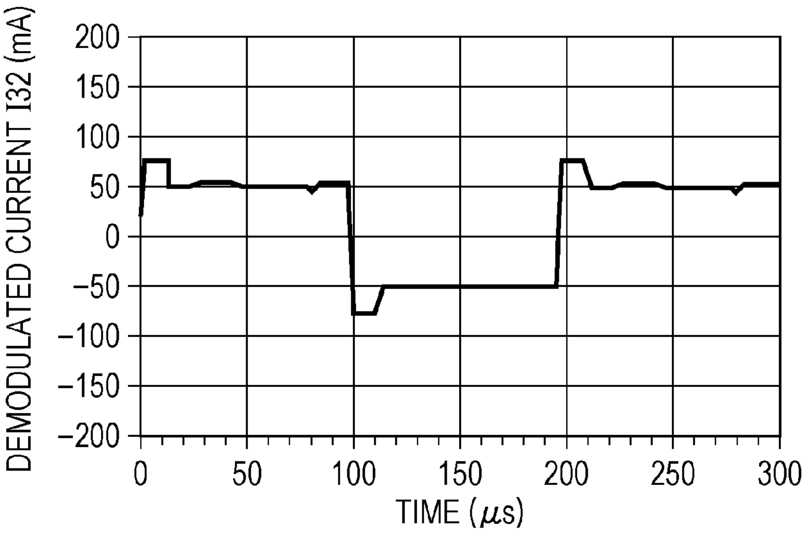
FIG. 17E is a waveform graph illustrating the waveform of a second demodulated current according to the first modification of the fourth embodiment.
Figure 20A:
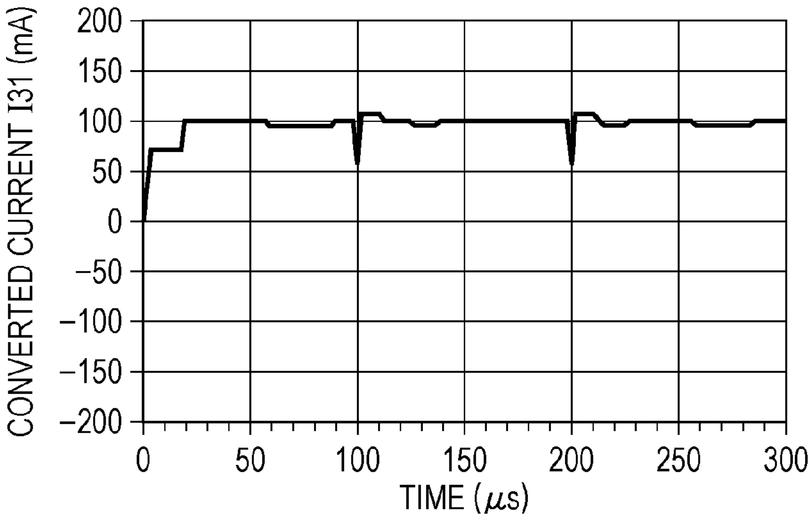
FIG. 20A is a graph illustrating the waveform of a converted current according to a fourth modification of the fourth embodiment.
Figure 20B:
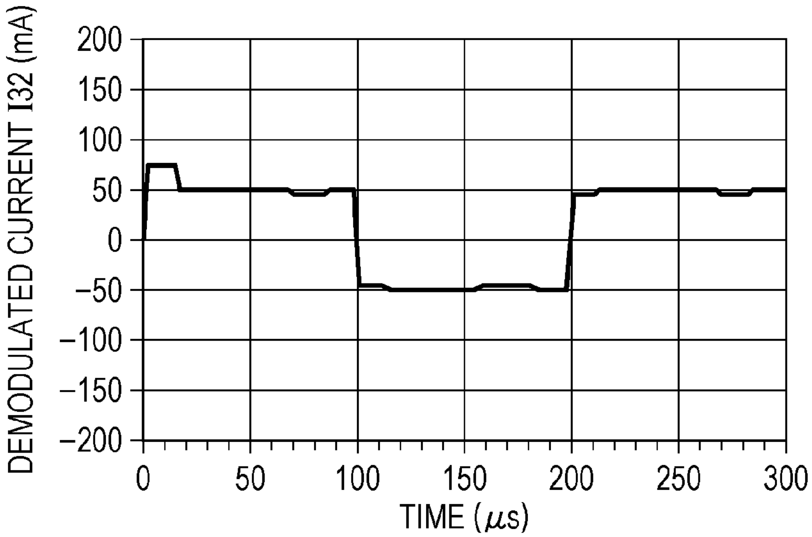
FIG. 20B is a graph illustrating the waveform of a demodulated current according to the fourth modification of the fourth embodiment.

In the fourth modification, the waveforms of a generated current I11, a generated current I12, and a modulated current I2 are analogous to the waveforms illustrated in FIGS. 17A, 17B, and 17C, respectively. FIGS. 20A and 20B illustrate the waveforms of a converted current I31 and a demodulated current I32, respectively.

Comparison between FIG. 17A and FIG. 20A shows that the alternating current I11 generated by the electric generator 1*a* was transmitted to the load 5*a* as the direct current I31 through the code modulation and predetermined conversion. Comparison between FIG. 17B and FIG. 20B shows that the alternating current I12 generated by the electric generator 1*b* was transmitted to the load 5*b* through the code modulation and demodulation.

With the arrangement described above, the power transmission system 400 allows a plurality of alternating-current powers to be concurrently and independently transmitted. In addition, the transmitted modulated power can be converted into desired direct-current power.

[2-4-5. Direct-Current-Power and Alternating-Current-Power Code Modulation and Demodulation Involving AC-DC Conversion]

In a fifth modification, direct current and alternating current were code-modulated into two code-modulated currents, one of the code-modulated currents was then code-demodulated into a direct current, and the other code-modulated current was converted into a predetermined direct current.

In the fifth modification, control signals m1 to m4 input to the code modulator 2*a* and control signals d1 to d4 input to the code demodulator 4*a* had the code sequences shown in Table 4 described above. Control signals m1 to m4 input to the code modulator 2*b* had the code sequences shown in Table 6 described above. Control signals d1 to d4 input to the code demodulator 4*b* had the code sequences shown in Table 5 described above.

Figure 18A:
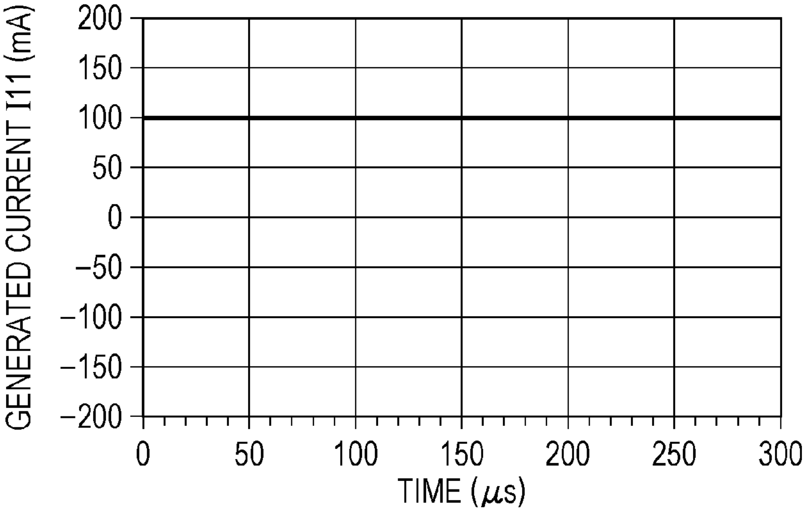
FIG. 18A is a graph illustrating the waveform of a first generated current according to a second modification of the fourth embodiment.
Figure 18B:
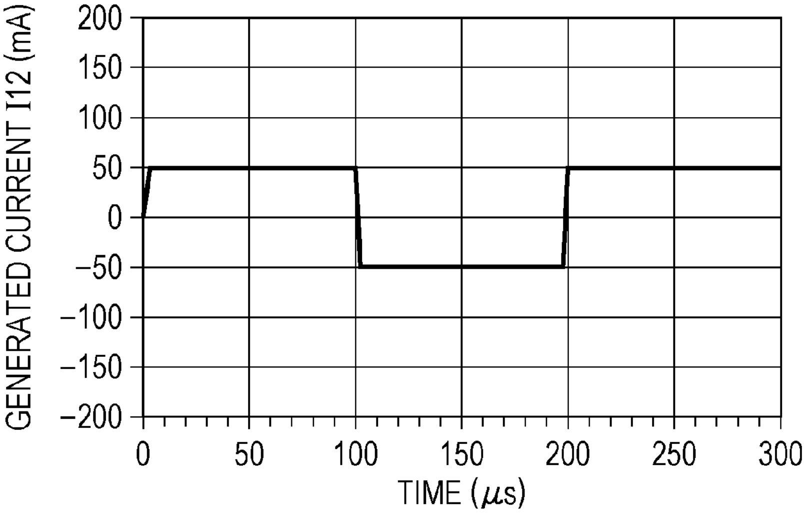
FIG. 18B is a graph illustrating the waveform of a second generated current according to the second modification of the fourth embodiment.
Figure 18C:
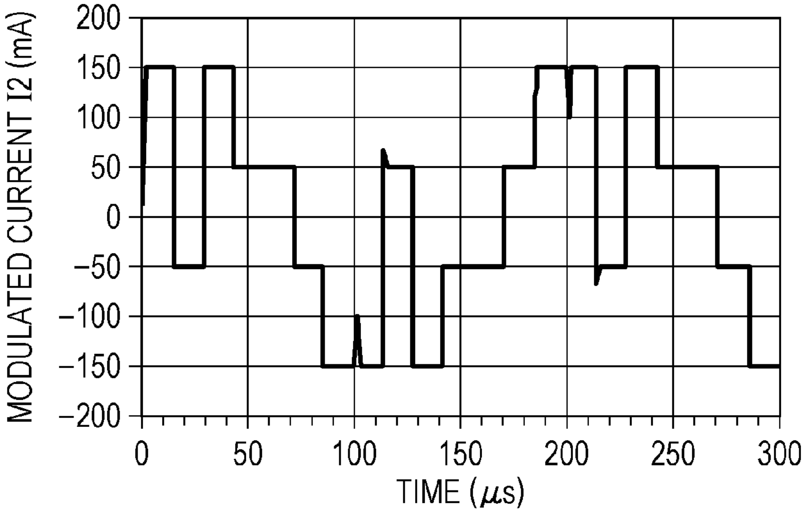
FIG. 18C is a graph illustrating the waveform of a modulated current according to the second modification of the fourth embodiment.
Figure 18D:
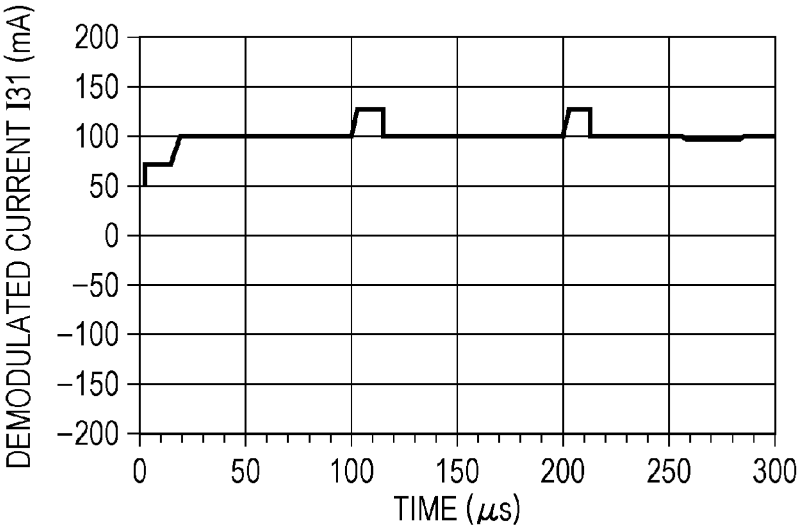
FIG. 18D is a graph illustrating the waveform of a first demodulated current according to the second modification of the fourth embodiment.
Figure 18E:
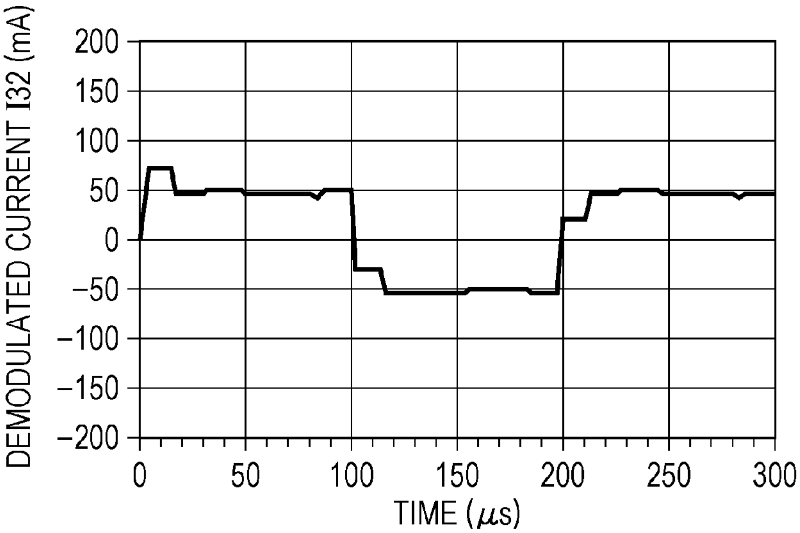
FIG. 18E is a graph illustrating the waveform of a second demodulated current according to the second modification of the fourth embodiment.
Figure 21A:
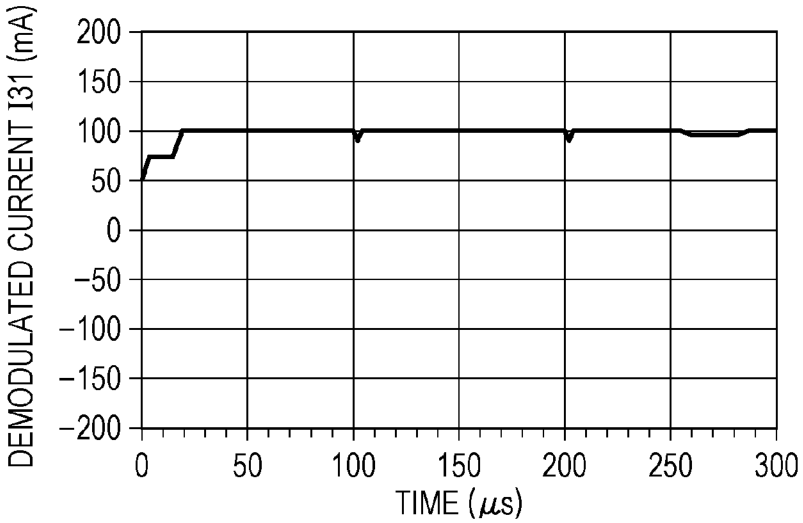
FIG. 21A is a graph illustrating the waveform of a demodulated current according to a fifth modification of the fourth embodiment.
Figure 21B:
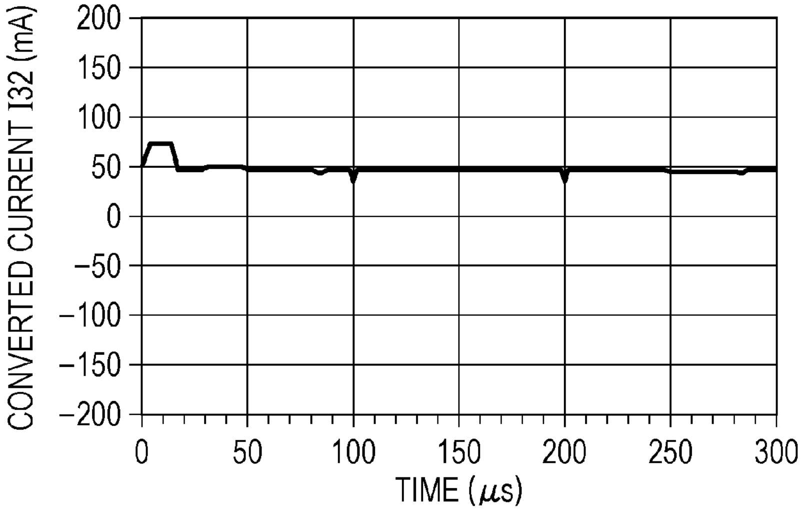
FIG. 21B is a graph illustrating the waveform of a converted current according to the fifth modification of the fourth embodiment.

The waveforms of a generated current I11, a generated current I12, and a modulated current I2 were analogous to the waveforms illustrated in FIGS. 18A to 18C. FIGS. 21A and 21B illustrate the waveforms of a demodulated current I31 and a converted current I32, respectively.

Comparison between FIG. 18A and FIG. 21A shows that the direct current I11 generated by the electric generator 1*a* was transmitted to the load 5*a* through the code modulation and demodulation. Comparison between FIG. 18B and FIG. 21B shows that the alternating current I11 generated by the electric generator 1*a* was transmitted to the load 5*b* as the direct current I32 through the code modulation and predetermined conversion.

With the above-described operation, the power transmission system 400 allows direct-current power and alternating-current power to be concurrently and independently transmitted. In addition, the transmitted modulated power can be converted into desired direct-current power.

[2-4-6. Supplementary]

In the modifications described above, the time average of the modulated current I2 was 0. That is, the modulated current I2 was an alternating current that does not include direct current components. Thus, power transmission can be realized with high transmission efficiency.

Since a plurality of powers are transmitted through the same transmission path 3, the transmission path 3 can be simplified. For example, when the transmission path 3 is a cable, it is possible to reduce the number of cables.

Since a plurality of modulated powers are combined, and the resulting modulated power is concurrently transmitted, for example, the transmission time can be reduced compared with a scheme in which powers in a plurality of channels are transmitted in a time-division manner. In addition, according to the code modulation and demodulation scheme, since each power is transmitted independently, the power transmission can be performed without affecting transmission of other power.

Each of the code modulators 2*a* and 2*b* can execute code modulation by using an arbitrary modulation code. Similarly, each of the code demodulators 4*a* and 4*b* can execute code demodulation by using an arbitrary demodulation code. Alternatively, each of the code demodulators 4*a* and 4*b* can execute predetermined conversion by using an arbitrary conversion code based on a modulation code. Accordingly, pairing between the code modulators and the code demodulators can be flexibly changed in accordance with an arbitrary combination of a modulation code and a demodulation code. For example, in FIG. 15, power transmission from the electric generator 1*a* to the load 5*b* and power transmission from the electric generator 1*b* to the load 5*a* may be executed concurrently. Even when the number of pairing patterns increases, an increase in the size of the circuit scale is suppressed. Accordingly, it is possible to realize power transmission with an apparatus having a reduced size.

Other Embodiments

The present disclosure is not limited to the specific examples described in the above-described embodiments. The disclosed technology is not limited to the specific examples described above in the embodiments and also encompasses modes obtained by appropriately performing a change, replacement, addition, omission, and so on to those embodiments. The present disclosure also encompasses a combined mode of some of the embodiments.

Although, in the first to fourth embodiments, each code sequence of the control signals, the modulation code, the demodulation code, and the conversion code is constituted by one or more orthogonal Gold sequences, the present disclosure is not limited thereto. For example, the modulation code, the demodulation code, and/or the conversion code may be other orthogonal codes. Examples of the other orthogonal codes include an m sequence.

Although, in the first to fourth embodiments, each code length of the control signals, the modulation code, the demodulation code, and the conversion code is 7 bits or 14 bits, the present disclosure is not limited thereto. The larger the code length, the larger the number of orthogonal codes that can be generated. Also, when the code length is increased, the correlation decreases to thereby make it possible to more accurately split power.

Although, in the third and fourth embodiments, the code modulator(s) and the code demodulator(s) have been described as being the corresponding circuits illustrated in FIGS. 9 and 10, they may be, for example, the circuits illustrated in FIG. 7. In such a case, the circuit configuration of the code modulator and the code demodulator is simplified, thereby making it possible to realize a reduction in cost and a reduction in the size of the apparatus.

Although an example in which a current is code-modulated and code-demodulated has been described in the first to fourth embodiments, a voltage may be code-modulated and code-demodulated or a current and a voltage may be modulated and demodulated.

Examples in which a generated current is input to the code modulator(s) has been described in the first to fourth embodiments, and the generated current is one example of "input power".

Any of the code modulators and the code demodulators in the first, second, and fourth embodiments can be made to function as a code modulator/demodulator. Accordingly, in the present disclosure, the "code modulator" is not limited to a circuit that functions as only a code modulator and also implicates a code modulator/demodulator. Similarly, in the present disclosure, the "code demodulator" is not limited to a circuit that functions as only a code demodulator and also implicates a code modulator/demodulator. Also, each of the code demodulators in the third to fifth modifications of the fourth embodiment is one example of a "converter" in the present disclosure.

Although an example in which each bidirectional switch circuit includes two switches has been described in the second embodiment, each bidirectional switch circuit may be implemented by, for example, a single bidirectional switch.

Overviews of Embodiments

A code modulator according to one aspect includes: a circuit that generates code-modulated power by code-modulating input power with a modulation code; and a terminal that is connected to a transmission path and through which the code-modulated power is transmitted. The code-modulated power is alternating-current power. For example, the modulation code may include an orthogonal code. For example, the circuit may include a plurality of switches.

For example, the circuit may be an H-bridge circuit in which four bidirectional switch circuits are connected in a full-bridge configuration.

For example, the code modulator may include a control circuit that generates a plurality of control signals for turning on and off the plurality of switches, and the circuit may code-modulate the input power, based on the plurality of control signals.

A code demodulator according to one aspect includes: a terminal that is connected to a transmission path to receive code-modulated power; and a circuit that generates output power by code-demodulating the code-modulated power with a demodulation code. The code-modulated power is alternating-current power. For example, the demodulation code may include an orthogonal code. For example, the circuit may include a plurality of switches.

For example, the circuit may be an H-bridge circuit in which four bidirectional switch circuits are connected in a full-bridge configuration.

For example, the code demodulator may further include a control circuit that generates a plurality of control signals for turning on and off the plurality of switches, and the circuit may code-demodulate the code-modulated power, based on the plurality of control signals.

A power transmission system according to one aspect includes the code modulator and the code demodulator. For example, the modulation code and the demodulation code are the same.

A controller according to one aspect includes a processor and a communication circuit. The processor executes: generating a first instruction signal for causing first code-modulated power to be generated by causing first power to be code-modulated with a first modulation code; transmitting the first instruction signal to a first code modulator via the communication circuit; generating a second instruction signal for causing second power to be generated by causing the first code-modulated power to be code-demodulated with a first demodulation code; and transmitting the second instruction signal to a first code demodulator via the communication circuit. The first code modulator and the first code demodulator are connected through a transmission path. The first code-modulated power is alternating-current power.

For example, the processor may further execute: generating a third instruction signal for causing second code-modulated power to be generated by causing third power to be code-modulated with a second modulation code; transmitting the third instruction signal to a second code modulator via the communication circuit; generating a fourth instruction signal for causing fourth power to be generated by causing the second code-modulated power to be code-demodulated with a second demodulation code; and transmitting the fourth instruction signal to a second code demodulator via the communication circuit. The second code-modulated power may be alternating-current power. The first modulation code and the second modulation code may be orthogonal to each other, and the first demodulation code and the second demodulation code may be orthogonal to each other. In this case, the first code-modulated power and the second code-modulated power are multiplexed, and multiplexed code-modulated power is transmitted through the transmission path.

For example, the communication circuit may be capable of communicating with a first device having a first circuit and may be capable of communicating with a second device having a second circuit. For example, the processor may further execute: obtaining first power information via the communication circuit, the first power information indicating an amount of power in the first device; obtaining second power information via the communication circuit, the second power information indicating an amount of power in the second device; and causing one of the first circuit and the second circuit to function as the first code modulator and causing the other circuit to function as the first code demodulator, based on the first power information and the second power information.

A method according to one aspect includes: generating first code-modulated power by code-modulating first power with a first modulation code; transmitting the first code-modulated power through a transmission path; and generating second power by code-demodulating the transmitted first code-modulated power with a first demodulation code. The first code-modulated power is alternating-current power.

For example, the method may further include: generating second code-modulated power by code-modulating third power with a second modulation code; transmitting the second code-modulated power through the transmission path; and generating fourth power by code-demodulating the transmitted second code-modulated power with a second demodulation code. The second code-modulated power is alternating-current power.

For example, the method may further include: obtaining first power information indicating an amount of power in a first device; obtaining second power information indicating an amount of power in a second device; and causing one of the first circuit and the second circuit to function as the first code modulator and causing the other circuit to function as the first code demodulator, based on the first power information and the second power information.

A converter according to one aspect includes: a terminal that receives code-modulated power; and a circuit that generates output power by converting the code-modulated power with a conversion code. The code-modulated power is generated by code-modulating predetermined power with a modulation code. The conversion code are generated based on the modulation code. The code-modulated power is alternating-current power.

For example, the predetermined power may be alternating-current power, and the output power may be direct-current power.

For example, the predetermined power may be direct-current power, and the output power may be alternating-current power.

For example, the conversion code may be generated using a demodulation code corresponding to the modulation code.

For example, the conversion code may be generated using the demodulation code and a conversion signal for converting the predetermined power into the output power.

For example, the conversion code may include an orthogonal code. For example, the circuit may include a plurality of switches.

For example, the circuit may be an H-bridge circuit in which four bidirectional switch circuits are connected in a full-bridge configuration.

For example, the converter may further include a control circuit that generates a plurality of control signals for turning on and off the plurality of switches, and the circuit may convert the code-modulated power, based on the plurality of control signals.

The power transmission system according to the present disclosure is useful for power transmission from an electric generator, such as a photovoltaic generator, a wind power generator, or a hydropower generator, to a train, an electric vehicle (EV), or the like.

What is claimed is:

1. A code modulator comprising:

a code-modulation circuit that code-modulates input power with a modulation code to generate code-modulated power which is alternating-current power; and a terminal through which the code-modulated power is transmitted, the terminal being connected to a transmission path, wherein, in code-modulation of the input power, the code-modulation circuit determines whether or not to reverse a direction of a current of the input power according to whether each bit of the modulation code is a first value or a second value.

2. The code modulator according to claim 1, wherein the modulation code includes an orthogonal code.

3. The code modulator according to claim 1, wherein the code-modulation circuit includes a plurality of switches.

4. The code modulator according to claim 3, wherein the code-modulation circuit includes an H-bridge circuit in which four bidirectional switch circuits are connected in a full-bridge configuration, each of the four bidirectional switch circuits including a corresponding one of the plurality of switches.

5. The code modulator according to claim 3, further comprising:

a control circuit that generates a plurality of control signals for turning on and off the plurality of switches, wherein the code-modulation circuit code-modulates the input power, based on the plurality of control signals.

6. The code modulator according to claim 5, further comprising:

a communication circuit that receives an instruction signal including code information regarding the modulation code and timing information regarding a timing for code-modulating the input power, wherein the control circuit generates the plurality of control signals according to the instruction signal.

7. The code modulator according to claim 1, wherein the input power is direct-current power or alternating-current power.

8. The code modulator according to claim 1, wherein the modulation code includes 2n-bit data including first n-bit data and second n-bit data following the first n-bit data, n being a natural number, and the second n-bit data are obtained by inverting bits of the first n-bit data, respectively.

9. A code demodulator comprising:

a terminal through which code-modulated power is received, the terminal being connected to a transmission path, the code-demodulated power being alternating-current power; and a code-demodulation circuit that code-demodulates the code-modulated power with a demodulation code to generate output power, wherein, in code-demodulation of the code-modulated power, the code-demodulation circuit determines whether or not to reverse a direction of a current of the code-modulated power according to whether each bit of the demodulation code is a first value or a second value.

10. The code demodulator according to claim 9, wherein the demodulation code includes an orthogonal code.

11. The code demodulator according to claim 9, wherein the code-demodulation circuit includes a plurality of switches.

12. The code demodulator according to claim 11, wherein the code-demodulation circuit includes an H-bridge circuit in which four bidirectional switch circuits are connected in a full-bridge configuration, each of the four bidirectional switch circuits including a corresponding one of the plurality of switches.

13. The code demodulator according to claim 11, further comprising:

a control circuit that generates a plurality of control signals for turning on and off the plurality of switches, wherein the code-demodulation circuit code-demodulates the code-modulated power, based on the plurality of control signals.

14. The code demodulator according to claim 13, further comprising:

a communication circuit that receives an instruction including code information regarding the demodulation code and timing information regarding a timing for demodulating the code-modulated power, wherein the control circuit generates the plurality of control signals according to the instruction signal.

15. The code demodulator according to claim 9, wherein the output power is direct-current power or alternating-current power.

16. The code demodulator according to claim 9, wherein the demodulation code includes 2n-bit data including first n-bit data and second n-bit data following the first n-bit data, n being a natural number, and the second n-bit data are obtained by inverting bits of the first n-bit data, respectively.

17. A controller comprising:

a processor; and a communication circuit, wherein the processor:

generates a first instruction signal for code-modulating first power with a first modulation code;

transmits the first instruction signal to a first code modulator via the communication circuit;

generates a second instruction signal for code-demodulating the code-modulated first power with a first demodulation code, the code-modulated first power being alternating-current power; and transmits the second instruction signal to a first code demodulator via the communication circuit, the first code demodulator being connected to the first code modulator through a transmission path.

18. The controller according to claim 17, wherein the first modulation code and the first demodulation code are the same.

19. The controller according to claim 17, wherein the first instruction signal includes first code information regarding the first modulation code and first timing information regarding a timing for code-modulating the first power, and the second instruction signal includes second code information regarding the first demodulation code and second timing information regarding a timing for code-demodulating the code-demodulated first power.

20. The controller according to claim 17, wherein the first power and the second power are both direct-current power or are both alternating-current power.

21. The controller according to claim 17, wherein the processor further:

generates a third instruction signal for code-modulating second power with a second modulation code;

transmits the third instruction signal to a second code modulator via the communication circuit;

generates a fourth instruction signal for code-demodulating the code-modulated second power with a second demodulation code, the code-modulated second power being alternating-current power; and transmits the fourth instruction signal to a second code demodulator via the communication circuit, wherein the first modulation code and the second modulation code are orthogonal to each other, the first demodulation code and the second demodulation code are orthogonal to each other, and the code-modulated first power and the code-modulated second power are multiplexed and transmitted through the transmission path.

22. The controller according to claim 17, wherein the communication circuit is configured to communicate with a first device having a first circuit and a second device having a second circuit; and the processor further:

obtains first power information via the communication circuit, the first power information regarding an amount of power in the first device;

obtains second power information via the communication circuit, the second power information regarding an amount of power in the second device; and sets one of the first and second circuits as the first code modulator and sets another of the first and second circuits as the first code demodulator, based on the first power information and the second power information.

* * * * *